(12) United States Patent
Khoryaev et al.

(10) Patent No.: US 12,010,053 B2
(45) Date of Patent: Jun. 11, 2024

(54) TRANSPORT BLOCK SIZE (TBS) DETERMINATION FOR SIDELINK COMMUNICATION

(71) Applicant: Intel Corporation, Santa Clara, CA (US)

(72) Inventors: Alexey Khoryaev, Nizhny Novgorod (RU); Mikhail Shilov, Nizhny Novgorod (RU); Sergey Panteleev, Nizhny Novgorod (RU); Kilian Roth, Munich (DE)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 17/174,161

(22) Filed: Feb. 11, 2021

(65) Prior Publication Data

US 2021/0194652 A1 Jun. 24, 2021

Related U.S. Application Data

(60) Provisional application No. 62/976,279, filed on Feb. 13, 2020.

(51) Int. Cl.
| | |
|---|---|
| *H04L 5/00* | (2006.01) |
| *H04L 5/06* | (2006.01) |
| *H04L 27/26* | (2006.01) |
| *H04W 72/02* | (2009.01) |
| *H04W 72/0453* | (2023.01) |
| *H04W 72/23* | (2023.01) |
| *H04W 76/14* | (2018.01) |

(52) U.S. Cl.
CPC .......... *H04L 5/0048* (2013.01); *H04L 5/0094* (2013.01); *H04L 5/06* (2013.01); *H04L 27/2613* (2013.01); *H04W 72/02* (2013.01); *H04W 72/0453* (2013.01); *H04W 72/23* (2023.01); *H04W 76/14* (2018.02)

(58) Field of Classification Search
CPC ....... H04L 5/0048; H04L 5/0094; H04L 5/06; H04L 27/2613; H04W 76/14; H04W 72/23; H04W 72/02; H04W 72/0453
USPC ......................................................... 370/329
See application file for complete search history.

(56) References Cited

U.S. PATENT DOCUMENTS

| 11,533,745 B2 * | 12/2022 | Hong ..................... H04L 1/0041 |
| 2021/0385804 A1 * | 12/2021 | Ye ........................... H04L 5/0048 |

(Continued)

FOREIGN PATENT DOCUMENTS

WO   WO-2021112575 A1 *   4/2019   ............... H04L 5/00

OTHER PUBLICATIONS

3GPP, "3rd Generation Partnership Project; Technical Specification Group Radio Access Network; NR; Study on NR Vehicle-to-Everything (V2X) (Release 16)", Mar. 2019, 122 pages.

(Continued)

*Primary Examiner* — Christopher R Crompton
(74) *Attorney, Agent, or Firm* — Schwabe, Williamson & Wyatt, P.C.

(57) ABSTRACT

Various embodiments herein provide techniques for transport block size (TBS) determination for communication on a physical sidelink shared channel (PSSCH). The embodiments may be used by vehicle-to-everything (V2X) user equipments (UEs). Other embodiments may be described and claimed.

14 Claims, 7 Drawing Sheets

(56) References Cited

U.S. PATENT DOCUMENTS

2022/0201711 A1* 6/2022 Lee ................. H04W 72/20
2022/0225353 A1* 7/2022 Peng ................ H04L 5/0053

OTHER PUBLICATIONS

3GPP, "New WID on 5G V2X with NR sidelink", LG Electronics, Huawei, Mar. 2019, 8 pages.
3GPP, "5G; NR; Physical layer procedures for data (3GPP TS 38.214 version 15.3.0 Release 15)", Oct. 2018, 99 pages.

* cited by examiner

Example sub-channel configuration with 10 PRB per sub-channel and a specific PSCCH allocation

TRANSPORT BLOCK SIZE (TBS) DETERMINATION FOR SIDELINK COMMUNICATION

CROSS REFERENCE TO RELATED APPLICATION

The present application claims priority to U.S. Provisional Patent Application No. 62/976,279, which was filed Feb. 13, 2020; the disclosures of which are hereby incorporated by reference.

FIELD

Embodiments relate generally to the technical field of wireless communications.

BACKGROUND

Third Generation Partnership Project (3GPP) Radio Access Network (RAN) has recently finalized a Study Item (SI) on New Radio (NR)-vehicle-to-everything (V2X), which is reported in 3GPP Technical Report (TR) 38.885. In the sequence, 3GPP RAN has approved a new Work Item (WI) to develop the corresponding specifications for 5G V2X, especially the sidelink (SL) part based on NR.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for transport block size (TBS) determination for communication by a user equipment (UE) on a physical sidelink shared channel (PSSCH). In some embodiments, the techniques may be used by vehicle-to-everything (V2X) user equipments (UEs).

Transport Block Size (TBS) Determination

Method of TBS Determination for New Radio (NR) Vehicle-to-Everything (V2X) Sidelink Communication During the calculation of the TBS in the NR downlink (DL) system, it is assumed that the number of resource elements (REs) for physical downlink shared channel (PDSCH) per physical resource block (PRB) is constant across the whole allocation of the PDSCH. Afterwards, the TBS is determined by multiplying the number of REs with the spectral efficiency defined by the modulation and coding scheme (MCS). However, in the case of the sidelink (SL), such as when physical sidelink control channel (PSCCH) and physical sidelink shared channel (PSSCH) are multiplexed, the assumption of constant PSSCH REs across all allocated PRBs is not valid. In contrast to the DL, the SL also has to handle the effect of symbols possibly being not usable due to the automatic gain control (AGC) adaptation.

Figure 1:
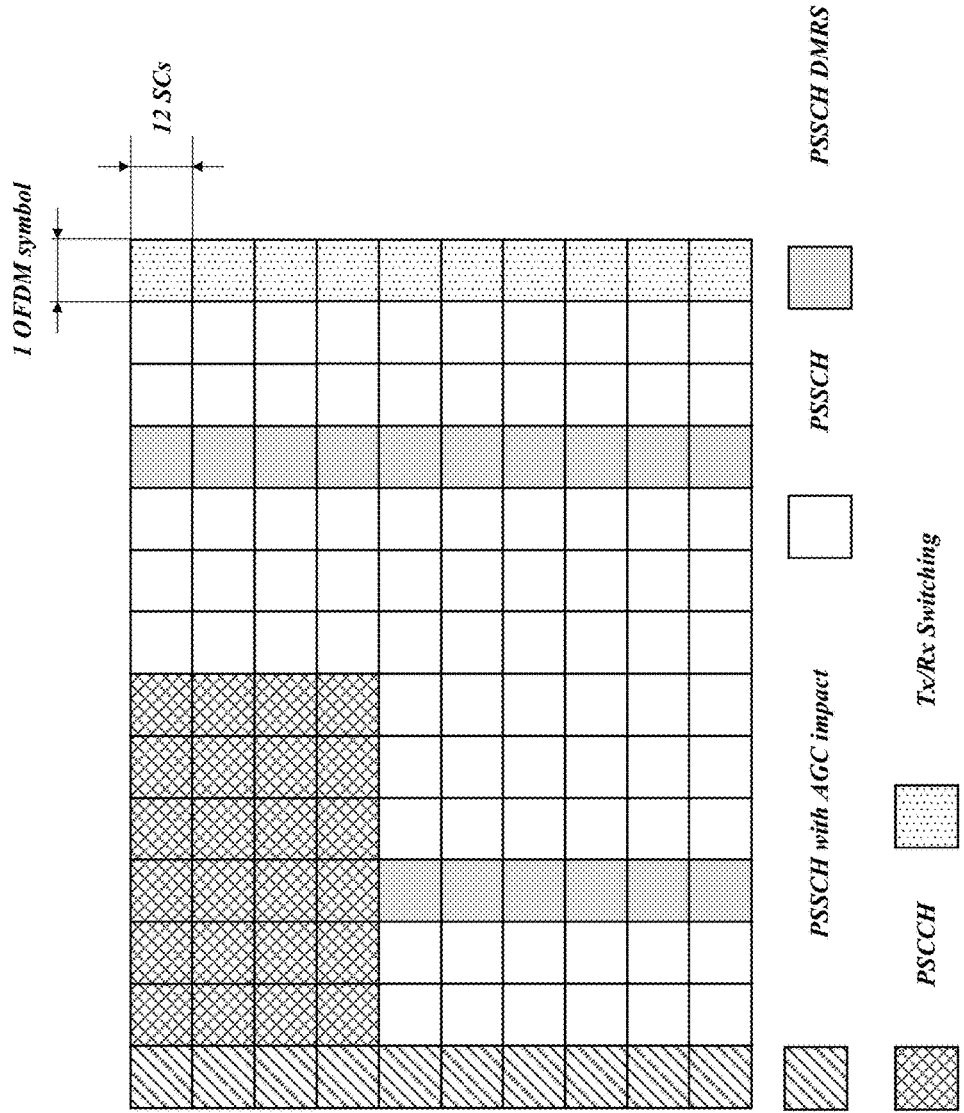
FIG. 1 illustrates an example sub-channel configuration with 10 physical resource blocks (PRBs) per sub-channel and a specific physical sidelink control channel (PSCCH) allocation, in accordance with various embodiments.

The example resource allocation for PSCCH and PSSCH in FIG. 1 illustrates the problem. As in this case the PSCCH is not allocated in all PRBs, the PRB structure is not uniform and the calculation in 3GPP Technical Specification (TS) 38.214: "NR; Physical layer procedures for data", v15.3.0, October 2018 (hereinafter "TS 38.214"), Section 5.1.3.2 would lead to a wrong result. For this example we use Rel. 15 Type-I CP-OFDM DMRS with multiplexing of DMRS and PSSCH symbols in the same OFDM symbol. For the illustrated example the calculation of the number of REs according to TS 38.214, section 5.1.3.2 would looks as follows:

$$N'_{RE}=N_{sc}^{RB}N_{symb}^{sh}-N_{DMRS}^{PRB}-N_{oh}^{PRB}$$

$$N_{RE}=\min(156, N'_{RE})\cdot n_{PRB}$$

Inserting the numbers for the example provides:

$$N'_{RE}=12\cdot12-12-0=132$$

$$N'_{RE}=\min(156,132)\cdot10=1320$$

Basically even for the ideal case without any additional channels, we would not get the correct result as this formulas implicitly assume a uniform structure of the allocated channels for each PRB. As this is not the case for our system to get the correct number of REs we need to use the following calculation:

$$N_{RE}=n_{PRB}N_{sc}^{RB}N_{symb}^{sh}-N_{RS}^{RE}-N_{PSCCH}^{RE}$$

$N_{RE}=12\cdot12\cdot10-96-288=1056$ in this case, the parameters $N_{RS}^{RE}$ and $N_{PSCCCH}^{RE}$ represent the number of REs allocated for sidelink RS (DMRS) and PSCCH allocation/configuration.

Problematic TBS Determination Scenarios for NR V2X Sidelink

The following aspects can affect TBS determination procedure for NR V2X sidelink communication:
PSCCH allocation in part of the PSSCH sub-channels and symbols;
Dynamic CSI-RS resource allocation;
Sidelink DMRS for PSSCH;
AGC symbol;
TX-RX switching symbol;
PSFCH resource allocation;
Different slot structures with variable number of REs from slot to slot that may be used for sidelink operation in licensed carriers; and/or
Slot aggregation/concatenation.

PSCCH and Sidelink TBS Determination

Figure 2:
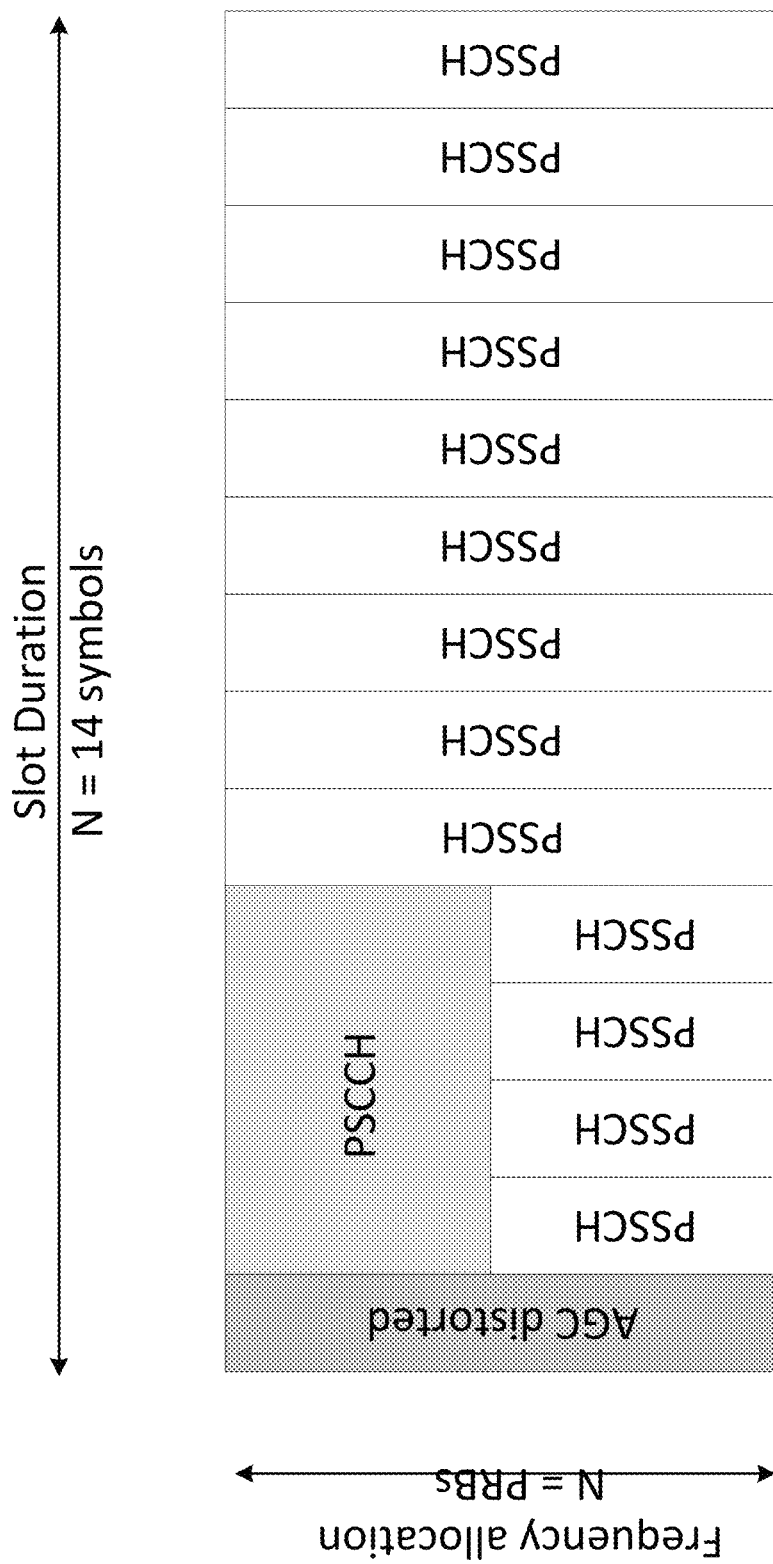
FIG. 2 illustrates a resource allocation for PSCCH and physical sidelink shared channel (PSSCH) for New Radio (NR)-vehicle-to-everything (V2X), in accordance with various embodiments.
Figure 3:
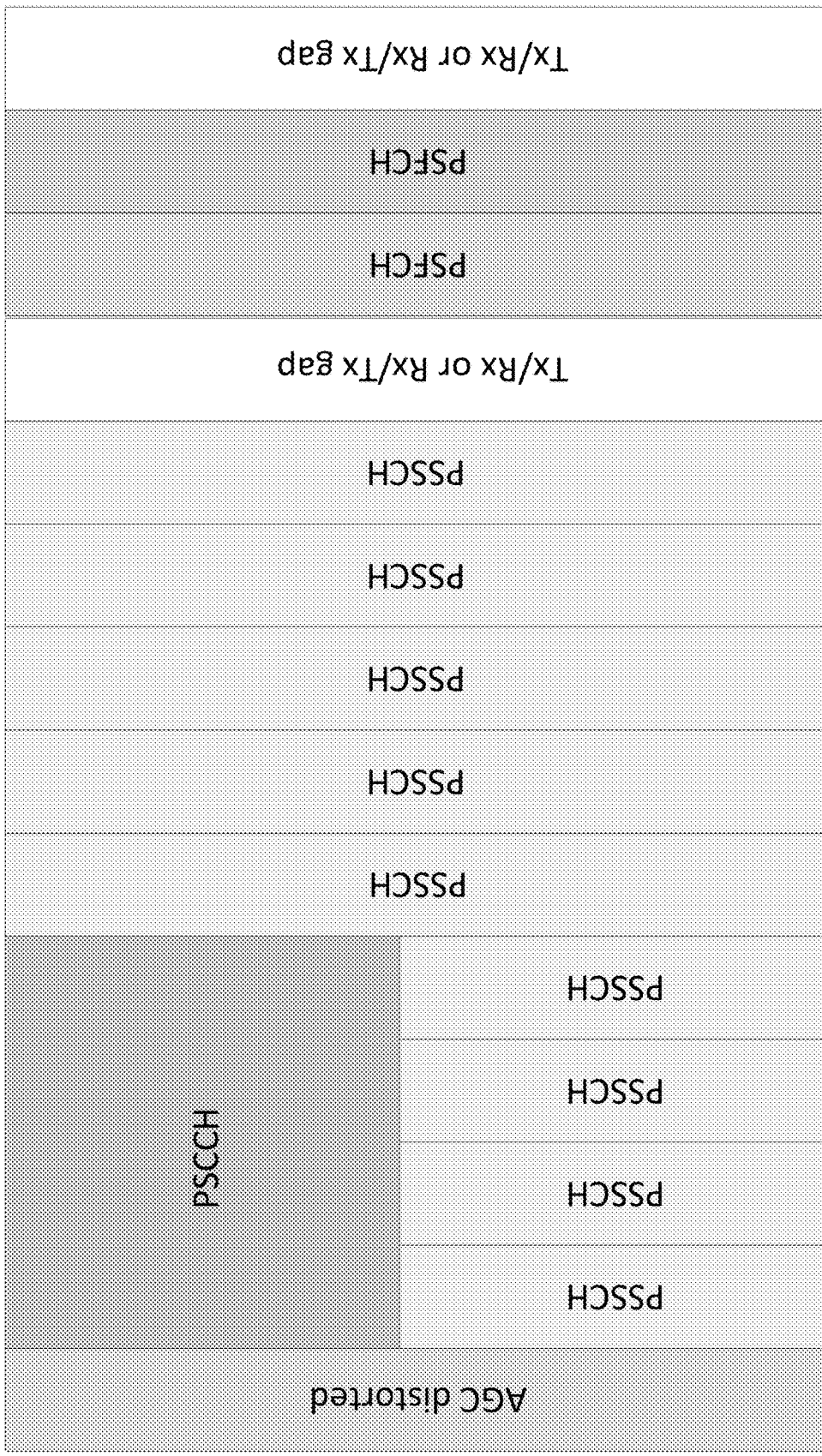
FIG. 3 illustrates a sidelink slot with allocated physical sidelink feedback channel (PSFCH), in accordance with various embodiments.

The PSCCH channel for NR V2X design is allocated within PSSCH region and may occupy only part of PSSCH symbols and PRBs (see FIG. 2). Therefore for TBS determination procedure that assume the same overhead per PRB is not valid. The number of available REs (resource elements) should be determined across PSSCH allocation by excluding REs occupied by PSCCH (PSCCH overhead).

Therefore number of REs can be calculated explicitly using formula bellow $$N_{RE} = n_{PRB} N_{sc}^{RB} N_{symb}^{sh} - N_{RS}^{RE} - N_{PSCCH}^{RE}$$

Another alternative is to estimate effective overhead per PRB for given PSSCH allocation and apply legacy procedure for calculation of $N_{RE}$ $$N_{oh}^{PRB} = (n_{PRB}^{PSSCH} N_{sc}^{RB} N_{symb}^{sh} - n_{PRB}^{PSCCH} N_{sc}^{RB} N_{symb}^{ch})/n_{PRB}^{PSSCH}$$

$$N'_{RE} = N_{sc}^{RB} N_{symb}^{sh} - N_{DMRS}^{PRB} - N_{oh}^{PRB}$$

$$N_{RE} = \min(156, N'_{RE}) \cdot n_{PRB}$$

The RE overhead associated with the PSCCH can be directly determined from the resource pool configuration of the PSCCH/PSSCH and actual dynamic allocation of PSCCH (number of REs occupied including the possibly dynamic allocation of the second stage SCI) and PSSCH (number of sub-channels used for transmission).

Dynamic CSI-RS, PTR-RS and Other Resource Allocation and Sidelink TBS Determination Similar to the PSCCH, the overhead associated with sidelink CSI-RS, PTR-RS or other dynamic allocated resources may need to be taken into account for NR V2X sidelink TBS determination. As an example we use CSI-RS but the argument is valid for any resources that can be dynamically added to the system. The sidelink CSI-RS may or may not be present in each transmission of the given or different HARQ processes. How presence of CSI-RS is taken into account in TBS determination should be interpreted in a common way by transmitter and receiver. One or more of the following options may be used:
1) REs that occupied by CSI-RS are not used for TBS determination independently of whether CSI-RS is transmitted or not;
2) Number of PSSCH REs is reduced by the amount of REs occupied by CSI-RS;
3) Number of PSSCH REs is reduced by the preconfigured amount of REs to reflect the possible impact of CSI-RS; and/or
4) Number of PSSCH REs per RPB is reduced by the $N_{oh}^{CSI-RS}$, where $N_{oh}^{CSI-RS}$ is preconfigured.

The UE implementation need to select an MCS that would not have problems for the case that CSI-RS are present in some of the retransmissions.

AGC Symbol and Sidelink TBS Determination

In sidelink communication, the first symbol of sidelink transmission may be corrupted by AGC at the receiver side (see FIG. 2). RX UE may simply puncture this symbol and therefore effectively increase code-rate at RX. If AGC symbol is taken into account in the TBS determination this may improve robustness for reception.

The following design options can be used with respect to AGC issue for sidelink TB S determination:
1) REs that occupied by first symbol of PSSCH are not used for TBS determination independently of the assumption on whether those corrupted at RX or not;
2) Number of PSSCH REs is reduced by the amount of REs occupied by one symbol of PSSCH allocation (e.g. number of symbols is effectively reduced by one);
3) Number of PSSCH REs is reduced by the preconfigured amount of REs to reflect impact of AGC symbol; and/or
4) Number of PSSCH REs per RPB is reduced by the $N_{oh}^{AGC}$, where $N_{oh}^{AGC}$ is preconfigured.

The UE implementation need to select an MCS that would not have problems for the case when AGC symbol is punctured or not punctured by UE RX.

TX-RX Switching Symbol and Sidelink TBS Determination

Similar to AGC symbol there are following options how to take into account symbols used for TX-RX/RX-TX switching in TBS determination. One or more of the following options may be used:
1) REs that utilized for TX/RX and RX/TX switching are not used for TBS determination by both TX and RX UE;
2) Number of PSSCH REs is reduced by the amount of REs occupied by one symbol for the purpose of TX-RX switching (e.g. number of symbols is effectively reduced by one);
3) Number of PSSCH REs is reduced by the preconfigured amount of REs to reflect impact of TX-RX/RX-TX switching symbol; and/or
4) Number of PSSCH REs per RPB is reduced by the $N_{oh}^{TX-RX}$, where $N_{oh}^{TX-RX}$ is preconfigured.

PSFCH and Sidelink TBS Determination

In case of PSFCH the procedure for TBS determination may be a bit more specific. The PSFCH channel is allocated every N slots where N=1, 2, 4. The PSFCH channel is allocated at the end of the slot and use two symbols for transmissions (one of them for AGC). Two TX-RX switching intervals are needed one before and one after PSFCH transmission Case—1 PSFCH is Allocated Every Sidelink Slot (N=1)

If PSFCH is semi-statically allocated every slot, e.g. N=1 there no issue and TBS determination can be done by reducing number of symbols for PSSCH on amount of symbols occupied by the PSFCH region and associated TX/RX and RX/TX switching gaps. One or more of the following options may be used in accordance with various embodiments:
1. Reduce number of REs in PSSCH by excluding REs occupied for PSFCH and TX/RX switching symbols $$N_{RE} = n_{PRB} N_{sc}^{RB} N_{symb}^{sh} - N_{RS}^{RE} - N_{PSCCH}^{RE} - n_{PRB} N_{sc}^{RB} N_{symb}^{PSFCH+TXRX\_Switching}$$

2. Reduce number of effective REs per PRB on PSFCH and TX/RX switching symbols $$N'_{RE} = N_{sc}^{RB} N_{symb}^{sh} - N_{DMRS}^{PRB} - N_{oh}^{PRB} - N_{sc}^{RB} N_{symb}^{PSFCH+TXRX\_Switching}$$

3. Take into account in $N_{oh}^{PRB}$ $$N_{oh}^{PRB} = N_{oh}^{PRB} + N_{sc}^{RB} N_{symb}^{PSFCH+TXRX\_Switching}$$

4. No special handling is needed. In the case that a PSFCH is allocated in every slot, or in none of the slots in the configured pool, no special handling is needed as for each retransmission with the same numbers of sub-channels allocated the calculated TBS would be the same. However it may result in increased code rate (CR) and potentially lead to non-self decodable transmissions Case—2: PSFCH is Allocated Every Sidelink $2^{nd}$ or $4^{th}$ Slot (N=2 or 4)

If PSCFH is allocated every $2^{nd}$ or $4^{th}$ slot then different slots have different number of REs for PSSCH transmission. Independently of where PSSCH is transmitted on slots w/o PSFCH or with PSFCH allocated both TX UE and RX UE should have a common understanding how TBS determination was calculated. One or more of the following options may be used:

Option 1: The TBS determination rule is not dependent on slot where PSCCH/PSSCH was initially transmitted for a given TB.

Option 2: The TBS determination rule is dependent on slot where PSCCH/PSSCH was initially transmitted for a given TB.

For Option 1, the TBS determination rule may be pre-configured for each value of N. For instance different values of $N_{oh}^{PRB}$ can be configured per pool/carrier etc.

For Option 2, the following aspects may be used:

1: UE signals in PSCCH/SCI specific parameter for TBS determination e.g. indicates slot type (e.g. with PSFCH or w/o PSFCH) that was used for TBS determination during initial and therefore subsequent transmissions. The TBS determination rule itself may be semi-statically configured for each slot type and value N as for Case—1 considered above.

2: SCI signals all forward (future) and backward (past) resources used for transmission of a given TB, so that UE can derive slot type used for initial PSSCH transmission and thus TBS determination. The TBS determination rule itself may be semi-statically configured for each slot type and value N as for Case—1 considered above.

Slot Concatenation and TBS Determination

And additional aspect is the TBS determination for the case of slot aggregation/concatenation. If from the PSSCH resource signalling in the SCI we can derive that slot aggregation/concatenation is used, the number or resources available for the PSSCH is determined using all aggregated slots.

Variable Slot Structures

And addition special case is the case for a NR V2X SL operation in the licensed spectrum alongside a DL and UL. In this case we can solve the issue in the same way as for PSFCH slots. From system level perspective it has to be know if past SL transmission were using the full slot or the half slot format. This means future transmission or addition RVs can determine the original TBS by calculating with the slot format in the original transmission.

The slot structures with variable number of symbols for PSSCH can be addressed in the same way as proposed to resolve issues with PSFCH as described in section 5.1.

Sidelink Transmissions with CR>1

For the case of large packets, it is desirable to enable transmissions with an effective CR>1 per single slot. In this case a (pre)-configured scaling of the TBS values can be configured. It is also possible to scale the CR value in the MCS table. A third alternative is for the in this document predefined overhead and resource that can be (pre)-configured for the TBS determination. By setting these to values to a higher value than the actual allocation the resulting TBS would also be scaled.

As this is only interesting for transmission with the highest modulation order only these should be scaled, to not impact transmissions with the lowest MCS.

Handling Transmissions with Different Number of Sub-Channels Allocated

It could be possible that an initial transmission of a standalone control channel or a reduced size transmission would reserve resources for the following transmissions. In this case it is not useful to determine the TBS size based on the initial transmission, as it will have a much smaller amount of PSSCH resources. If we can assume that the number of allocated sub-channel stays the same across all following transmissions it is reasonable to determine the TBS (even for the initial transmission) based on the allocated resource used in the allocation of the following resources. This is possible since the purpose of the initial transmission is resource reservation. This means the resources available in the following transmissions of the same TB is already know in the initial transmission and all following transmissions.

Another special case that needs to be considered is the possibilities of having transmissions from the same TB allocating different amount of sub-channels. In this cases if only the current allocation is taken into account the resulting TBS would be different. As we can assume that the frequency resources in multiple TTIs are reserved in each transmission, this means the amount of allocated sub-channels for each for the reserved transmission is known. The following solutions are possible:

Defined Rule which of the Transmissions should be Used for TBS Determination:

This rule would then determine which amount of resources among the ones reserved for the TB is used for the TBS determination. It can be as simple as for all reserved resources in the current TTI use the one with the smallest/largest amount of PSSCH resource for the TBS determination. This also means that the transmitter needs to be aware of this rule and always guarantee that the reserved resources for each of the transmissions belonging to the same TB result in the correct TBS.

Dynamic Signaling of the Resources Used for TBS Determination:

It is also possible to dynamically signal the amount of resources used for TBS determination. This means that this information needs to be part of the control channel.

Link Based Pre-Configuration:

For example during the initial handshaking for establishing a unicast transmission both devices could agree on the resources used for TBS determination. This is especially useful if only one type of message with approximately the same size, using the same MCS is going to be exchanged.

In addition it is also possible that transmissions with different amount of sub-channel allocations is combined with the previously described initial transmission of standalone control channel or reduced size initial transmission.

Optional Exclusion of Possible Punctured Symbols from TBS Determination:

For some cases it might be useful to exclude symbols that are possibly punctured at transmitter and/or receiver from the TBS determination. One example in the context of NR V2X are the symbols that are transmitted during the time the AGC is adapting at the receivers. This needs to be system wide configured and can for example be part of the resource pool configuration.

In one example, semi-static (pre-)configuration per sidelink transmission and reception resource pool may enable taking into account in TBS determination N symbols used for AGC adaptation, where N may be configured from set of 0,1,2 OFDM symbols.

In another example, an overhead value NOH per PRB for the TBS determination formula can be configured per sidelink transmission and reception resource pool. This overhead for example may be from range (0, 6, 12, 18, 24) REs.

Handling the Special Case of Additional PRBs being Available as a Remainder after Split into Sub-Channels After all available PRBs are separated into sub-channels of a predefined size there are in many cases some PRBs remaining. Inside a resource pool there are multiple ways of handling these additional PRBs, each of the ways also needs to be separately considered for the TBS determination.

Additional PRBs are Added to Last Sub-Channel:

In this case since additional transmissions of the same TB might not have these additional PRBs to have the same TBS the additional PRBs should be ignored for the purpose of TBS determination.

Additional PRBs Increase the Size of Some Sub-Channels by a Small Amount of PRBs:

This case may require the same handling as in the previous case. As other transmissions of the same TB might use a different frequency allocation the additional PRBs might not be present. Thus, they need to be ignored for the purpose of TBS determination, as otherwise different allocation of sub-channels lead to different TBS size.

Additional PRBs are Used as an Additional Smaller Sub-Channel:

In this case the additional smaller sub-channel needs to be treated as a sub-channel of full size. The reason is that if in other TTI transmissions with the same number of allocated sub-channels would occur the determined TBS should still be the same.

In addition, as dynamic PSSCH DMRS patterns were agreed, it may be possible that DMRS pattern used for the transmission of one TB changes in different slots, so this also needs to be considered in TBS determination. We take this into account by always assuming the most dense DMRS pattern is used (among configured DMRS patterns).

Currently there is a cross dependency between the TBS determination and the 2nd stage PSCCH resource calculation. Embodiments herein provide two alternative solutions of the TBS determination in this scenario. The first is assuming that the $2^{nd}$ stage PSCCH resource calculation is dependent on the calculated TBS, and the second one is assuming this is not the case and the amount of REs reserved for the $2^{nd}$ stage PSCCH in known at the time the TBS size is calculated.

In embodiments of alternative 1, the TBS may be determined as follows:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) \right) - N_{oh}^{PRB} n_{PRB} \quad (1)$$

where:

$M_{sc}^{PSSCH}(l)$ is the scheduled bandwidth of PSSCH transmission without remainder PRBs.

$M_{sc}^{DMRS}(l)$ is the number of subcarriers in OFDM symbol l that carries DMRS, in the PSSCH transmission assuming DMRS configuration with the most amount of REs (pre)-configured for the resource pool assuming that the PSFCH is present if configured, in all PRBs except remainder PRBs.

$M_{sc}^{PT-RS}(l)$ is the number of subcarriers in OFDM symbol l that carries PT-RS, in the PSSCH transmission in all PRBs except remainder PRBs $N_{symbol}^{PSSCH}$ is the number of allocated symbols for the PSSCH, if PSFCH is configured it is assumed to be present in all slots.

$N_{oh}^{PRB}$ is a per PRB overhead value preconfigured.

$n_{PRB}$ is the number of PRBs allocated to PSSCH excluding remainder PRBs

Further proceed with step 2) of clause 5.1.3.2 in 38.214.

In embodiments of alternative 2, the TBS may be determined as follows:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) - M_{SC}^{SCI-2}(l) \right) - N_{oh}^{PRB} n_{PRB}$$

where:

$M_{sc}^{PSSCH}(l)$ is the scheduled bandwidth of PSSCH transmission without remainder PRBs.

$M_{sc}^{DMRS}(l)$ is the number of subcarriers in OFDM symbol l that carries DMRS, in the PSSCH transmission assuming DMRS configuration with the most amount of REs (pre)-configured for the resource pool assuming that the PSFCH is present if configured, in all PRBs except remainder PRBs.

$M_{sc}^{PT-RS}(l)$ is the number of subcarriers in OFDM symbol l that carries PT-RS, in the PSSCH transmission in all PRBs except remainder PRBs.

$M_{SC}^{SCI-2}(l)$ is the number of subcarriers in OFDM symbol l that carry 2nd stage PSCCH symbols.

$N_{symbol}^{PSSCH}$ is the number of allocated symbols for the PSSCH, if PSFCH is configured it is assumed to be present in all slots.

$N_{oh}^{PRB}$ is a per PRB overhead value preconfigured.

$n_{PRB}$ is the number of PRBs allocated to PSSCH.

Further proceed with step 2) of clause 5.1.3.2 in 38.214.

Systems and Implementations

Figure 4:
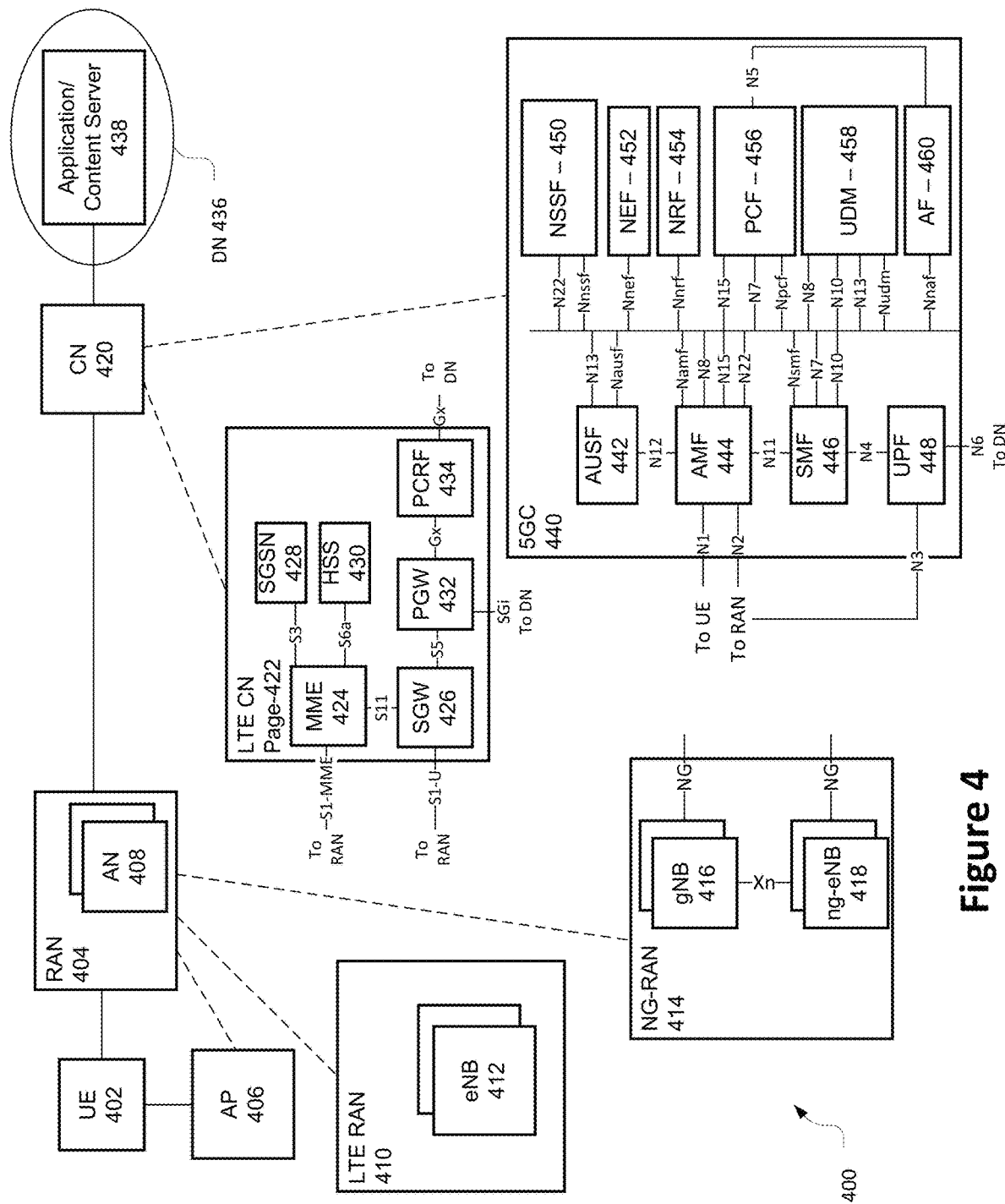
FIG. 4 schematically illustrates a wireless network in accordance with various embodiments.
Figure 5:
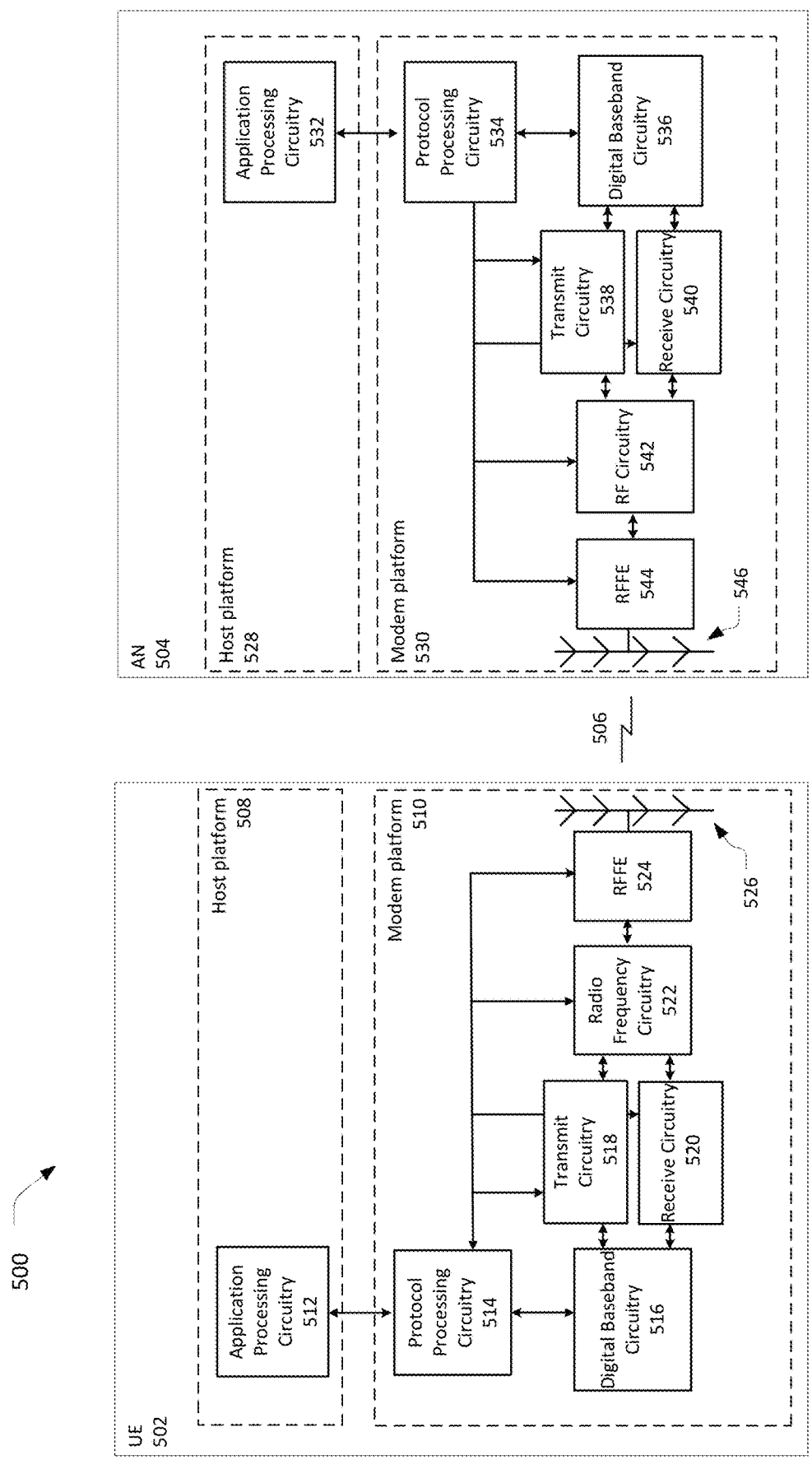
FIG. 5 schematically illustrates components of a wireless network in accordance with various embodiments.
Figure 6:
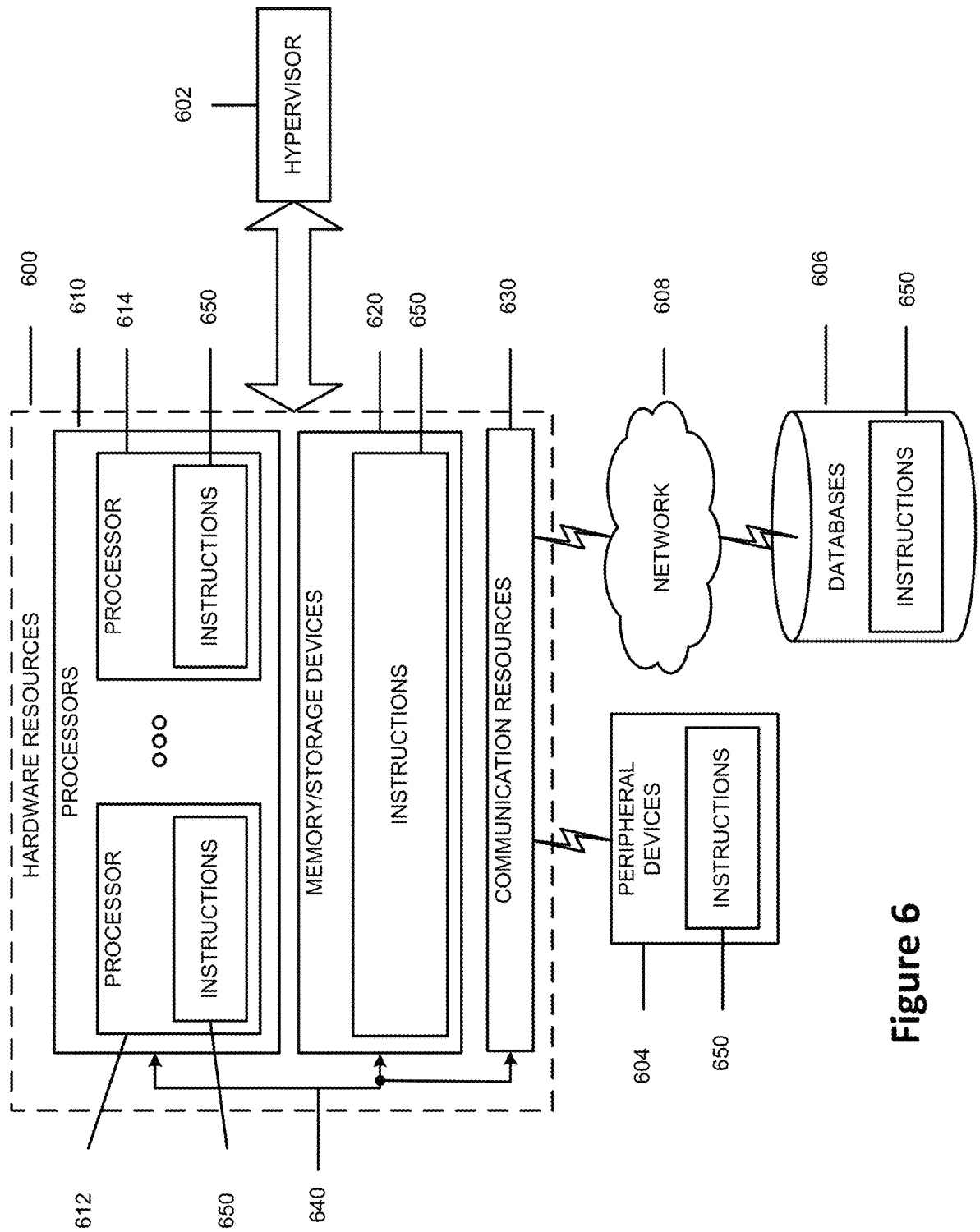
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 4-6 illustrate various systems, devices, and components that may implement aspects of disclosed embodiments.

FIG. 4 illustrates a network 400 in accordance with various embodiments. The network 400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 400 may include a UE 402, which may include any mobile or non-mobile computing device designed to communicate with a RAN 404 via an over-the-air connection. The UE 402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 402 may additionally communicate with an AP 406 via an over-the-air connection. The AP 406 may manage a WLAN connection, which may serve to offload some/all network traffic from the RAN 404. The connection between the UE 402 and the AP 406 may be consistent with any IEEE 802.11 protocol, wherein the AP 406 could be a wireless fidelity (Wi-Fi®) router. In some embodiments, the UE 402, RAN 404, and AP 406 may utilize cellular-WLAN aggregation (for example, LWA/LWIP). Cellular-WLAN aggregation may involve the UE 402 being configured by the RAN 404 to utilize both cellular radio resources and WLAN resources.

The RAN 404 may include one or more access nodes, for example, AN 408. AN 408 may terminate air-interface protocols for the UE 402 by providing access stratum protocols including RRC, PDCP, RLC, MAC, and L1 protocols. In this manner, the AN 408 may enable data/voice connectivity between CN 420 and the UE 402. In some embodiments, the AN 408 may be implemented in a discrete device or as one or more software entities running on server computers as part of, for example, a virtual network, which may be referred to as a CRAN or virtual baseband unit pool. The AN 408 be referred to as a BS, gNB, RAN node, eNB, ng-eNB, NodeB, RSU, TRxP, TRP, etc. The AN 408 may be a macrocell base station or a low power base station for providing femtocells, picocells or other like cells having smaller coverage areas, smaller user capacity, or higher bandwidth compared to macrocells.

In embodiments in which the RAN 404 includes a plurality of ANs, they may be coupled with one another via an X2 interface (if the RAN 404 is an LTE RAN) or an Xn interface (if the RAN 404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 404 may each manage one or more cells, cell groups, component carriers, etc. to provide the UE 402 with an air interface for network access. The UE 402 may be simultaneously connected with a plurality of cells provided by the same or different ANs of the RAN 404. For example, the UE 402 and RAN 404 may use carrier aggregation to allow the UE 402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 402 or AN 408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 404 may be an LTE RAN 410 with eNBs, for example, eNB 412. The LTE RAN 410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 404 may be an NG-RAN 414 with gNBs, for example, gNB 416, or ng-eNBs, for example, ng-eNB 418. The gNB 416 may connect with 5G-enabled UEs using a 5G NR interface. The gNB 416 may connect with a 5G core through an NG interface, which may include an N2 interface or an N3 interface. The ng-eNB 418 may also connect with the 5G core through an NG interface, but may connect with a UE via an LTE air interface. The gNB 416 and the ng-eNB 418 may connect with each other over an Xn interface.

In some embodiments, the NG interface may be split into two parts, an NG user plane (NG-U) interface, which carries traffic data between the nodes of the NG-RAN 414 and a UPF 448 (e.g., N3 interface), and an NG control plane (NG-C) interface, which is a signaling interface between the nodes of the NG-RAN 414 and an AMF 444 (e.g., N2 interface).

The NG-RAN 414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 402 can be configured with multiple BWPs where each BWP configuration has a different SCS. When a BWP change is indicated to the UE 402, the SCS of the transmission is changed as well. Another use case example of BWP is related to power saving. In particular, multiple BWPs can be configured for the UE 402 with different amount of frequency resources (for example, PRBs) to support data transmission under different traffic loading scenarios. A BWP containing a smaller number of PRBs can be used for data transmission with small traffic load while allowing power saving at the UE 402 and in some cases at the gNB 416. A BWP containing a larger number of PRBs can be used for scenarios with higher traffic load.

The RAN 404 is communicatively coupled to CN 420 that includes network elements to provide various functions to support data and telecommunications services to customers/subscribers (for example, users of UE 402). The components of the CN 420 may be implemented in one physical node or separate physical nodes. In some embodiments, NFV may be utilized to virtualize any or all of the functions provided by the network elements of the CN 420 onto physical compute/storage resources in servers, switches, etc. A logical instantiation of the CN 420 may be referred to as a network slice, and a logical instantiation of a portion of the CN 420 may be referred to as a network sub-slice.

In some embodiments, the CN 420 may be an LTE CN 422, which may also be referred to as an EPC. The LTE CN 422 may include MME 424, SGW 426, SGSN 428, HSS 430, PGW 432, and PCRF 434 coupled with one another over interfaces (or "reference points") as shown. Functions of the elements of the LTE CN 422 may be briefly introduced as follows.

The MME 424 may implement mobility management functions to track a current location of the UE 402 to facilitate paging, bearer activation/deactivation, handovers, gateway selection, authentication, etc.

The SGW 426 may terminate an S1 interface toward the RAN and route data packets between the RAN and the LTE CN 422. The SGW 426 may be a local mobility anchor point for inter-RAN node handovers and also may provide an anchor for inter-3GPP mobility. Other responsibilities may include lawful intercept, charging, and some policy enforcement.

The SGSN 428 may track a location of the UE 402 and perform security functions and access control. In addition, the SGSN 428 may perform inter-EPC node signaling for mobility between different RAT networks; PDN and S-GW selection as specified by MME 424; MME selection for handovers; etc. The S3 reference point between the MME 424 and the SGSN 428 may enable user and bearer information exchange for inter-3GPP access network mobility in idle/active states.

The HSS 430 may include a database for network users, including subscription-related information to support the network entities' handling of communication sessions. The HSS 430 can provide support for routing/roaming, authentication, authorization, naming/addressing resolution, location dependencies, etc. An S6a reference point between the HSS 430 and the MME 424 may enable transfer of subscription and authentication data for authenticating/authorizing user access to the LTE CN 420.

The PGW 432 may terminate an SGi interface toward a data network (DN) 436 that may include an application/content server 438. The PGW 432 may route data packets between the LTE CN 422 and the data network 436. The PGW 432 may be coupled with the SGW 426 by an S5 reference point to facilitate user plane tunneling and tunnel management. The PGW 432 may further include a node for policy enforcement and charging data collection (for example, PCEF). Additionally, the SGi reference point between the PGW 432 and the data network 436 may be an operator external public, a private PDN, or an intra-operator packet data network, for example, for provision of IMS services. The PGW 432 may be coupled with a PCRF 434 via a Gx reference point.

The PCRF 434 is the policy and charging control element of the LTE CN 422. The PCRF 434 may be communicatively coupled to the app/content server 438 to determine appropriate QoS and charging parameters for service flows. The PCRF 432 may provision associated rules into a PCEF (via Gx reference point) with appropriate TFT and QCI.

In some embodiments, the CN 420 may be a 5GC 440. The 5GC 440 may include an AUSF 442, AMF 444, SMF 446, UPF 448, NSSF 450, NEF 452, NRF 454, PCF 456, UDM 458, and AF 460 coupled with one another over interfaces (or "reference points") as shown. Functions of the elements of the 5GC 440 may be briefly introduced as follows.

The AUSF 442 may store data for authentication of UE 402 and handle authentication-related functionality. The AUSF 442 may facilitate a common authentication framework for various access types. In addition to communicating with other elements of the 5GC 440 over reference points as shown, the AUSF 442 may exhibit an Nausf service-based interface.

The AMF 444 may allow other functions of the 5GC 440 to communicate with the UE 402 and the RAN 404 and to subscribe to notifications about mobility events with respect to the UE 402. The AMF 444 may be responsible for registration management (for example, for registering UE 402), connection management, reachability management, mobility management, lawful interception of AMF-related events, and access authentication and authorization. The AMF 444 may provide transport for SM messages between the UE 402 and the SMF 446, and act as a transparent proxy for routing SM messages. AMF 444 may also provide transport for SMS messages between UE 402 and an SMSF. AMF 444 may interact with the AUSF 442 and the UE 402 to perform various security anchor and context management functions. Furthermore, AMF 444 may be a termination point of a RAN CP interface, which may include or be an N2 reference point between the RAN 404 and the AMF 444; and the AMF 444 may be a termination point of NAS (N1) signaling, and perform NAS ciphering and integrity protection. AMF 444 may also support NAS signaling with the UE 402 over an N3 IWF interface.

The SMF 446 may be responsible for SM (for example, session establishment, tunnel management between UPF 448 and AN 408); UE IP address allocation and management (including optional authorization); selection and control of UP function; configuring traffic steering at UPF 448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 444 over N2 to AN 408; and determining SSC mode of a session. SM may refer to management of a PDU session, and a PDU session or "session" may refer to a PDU connectivity service that provides or enables the exchange of PDUs between the UE 402 and the data network 436.

The UPF 448 may act as an anchor point for intra-RAT and inter-RAT mobility, an external PDU session point of interconnect to data network 436, and a branching point to support multi-homed PDU session. The UPF 448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 448 may include an uplink classifier to support routing traffic flows to a data network.

The NSSF 450 may select a set of network slice instances serving the UE 402. The NSSF 450 may also determine allowed NSSAI and the mapping to the subscribed S-NS-SAIs, if needed. The NSSF 450 may also determine the AMF set to be used to serve the UE 402, or a list of candidate AMFs based on a suitable configuration and possibly by querying the NRF 454. The selection of a set of network slice instances for the UE 402 may be triggered by the AMF 444 with which the UE 402 is registered by interacting with the NSSF 450, which may lead to a change of AMF. The NSSF 450 may interact with the AMF 444 via an N22 reference point; and may communicate with another NSSF in a visited network via an N31 reference point (not shown). Additionally, the NSSF 450 may exhibit an Nnssf service-based interface.

The NEF 452 may securely expose services and capabilities provided by 3GPP network functions for third party, internal exposure/re-exposure, AFs (e.g., AF 460), edge computing or fog computing systems, etc. In such embodiments, the NEF 452 may authenticate, authorize, or throttle the AFs. NEF 452 may also translate information exchanged with the AF 460 and information exchanged with internal network functions. For example, the NEF 452 may translate between an AF-Service-Identifier and an internal 5GC information. NEF 452 may also receive information from other NFs based on exposed capabilities of other NFs. This information may be stored at the NEF 452 as structured data, or at a data storage NF using standardized interfaces. The stored information can then be re-exposed by the NEF 452 to other NFs and AFs, or used for other purposes such as analytics. Additionally, the NEF 452 may exhibit an Nnef service-based interface.

The NRF 454 may support service discovery functions, receive NF discovery requests from NF instances, and provide the information of the discovered NF instances to the NF instances. NRF 454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 454 may exhibit the Nnrf service-based interface.

The PCF 456 may provide policy rules to control plane functions to enforce them, and may also support unified policy framework to govern network behavior. The PCF 456 may also implement a front end to access subscription information relevant for policy decisions in a UDR of the UDM 458. In addition to communicating with functions over reference points as shown, the PCF 456 exhibit an Npcf service-based interface.

The UDM 458 may handle subscription-related information to support the network entities' handling of communication sessions, and may store subscription data of UE 402. For example, subscription data may be communicated via an N8 reference point between the UDM 458 and the AMF 444. The UDM 458 may include two parts, an application front end and a UDR. The UDR may store subscription data and policy data for the UDM 458 and the PCF 456, and/or structured data for exposure and application data (including PFDs for application detection, application request information for multiple UEs 402) for the NEF 452. The Nudr service-based interface may be exhibited by the UDR 221 to allow the UDM 458, PCF 456, and NEF 452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 458 may exhibit the Nudm service-based interface.

The AF 460 may provide application influence on traffic routing, provide access to NEF, and interact with the policy framework for policy control.

In some embodiments, the 5GC 440 may enable edge computing by selecting operator/3rd party services to be geographically close to a point that the UE 402 is attached to the network. This may reduce latency and load on the network. To provide edge-computing implementations, the 5GC 440 may select a UPF 448 close to the UE 402 and execute traffic steering from the UPF 448 to data network 436 via the N6 interface. This may be based on the UE subscription data, UE location, and information provided by the AF 460. In this way, the AF 460 may influence UPF (re)selection and traffic routing. Based on operator deployment, when AF 460 is considered to be a trusted entity, the network operator may permit AF 460 to interact directly with relevant NFs. Additionally, the AF 460 may exhibit an Naf service-based interface.

The data network 436 may represent various network operator services, Internet access, or third party services that may be provided by one or more servers including, for example, application/content server 438.

FIG. 5 schematically illustrates a wireless network 500 in accordance with various embodiments. The wireless network 500 may include a UE 502 in wireless communication with an AN 504. The UE 502 and AN 504 may be similar to, and substantially interchangeable with, like-named components described elsewhere herein.

The UE 502 may be communicatively coupled with the AN 504 via connection 506. The connection 506 is illustrated as an air interface to enable communicative coupling, and can be consistent with cellular communications protocols such as an LTE protocol or a 5G NR protocol operating at mmWave or sub-6 GHz frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and downlink dynamic radio resource management, and data packet scheduling.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640 or other interface circuitry. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processors 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 630 may include interconnection or network interface controllers, components, or other suitable devices to communicate with one or more peripheral devices 604 or one or more databases 606 or other network elements via a network 608. For example, the communication resources 630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Example Procedures

Figure 7:
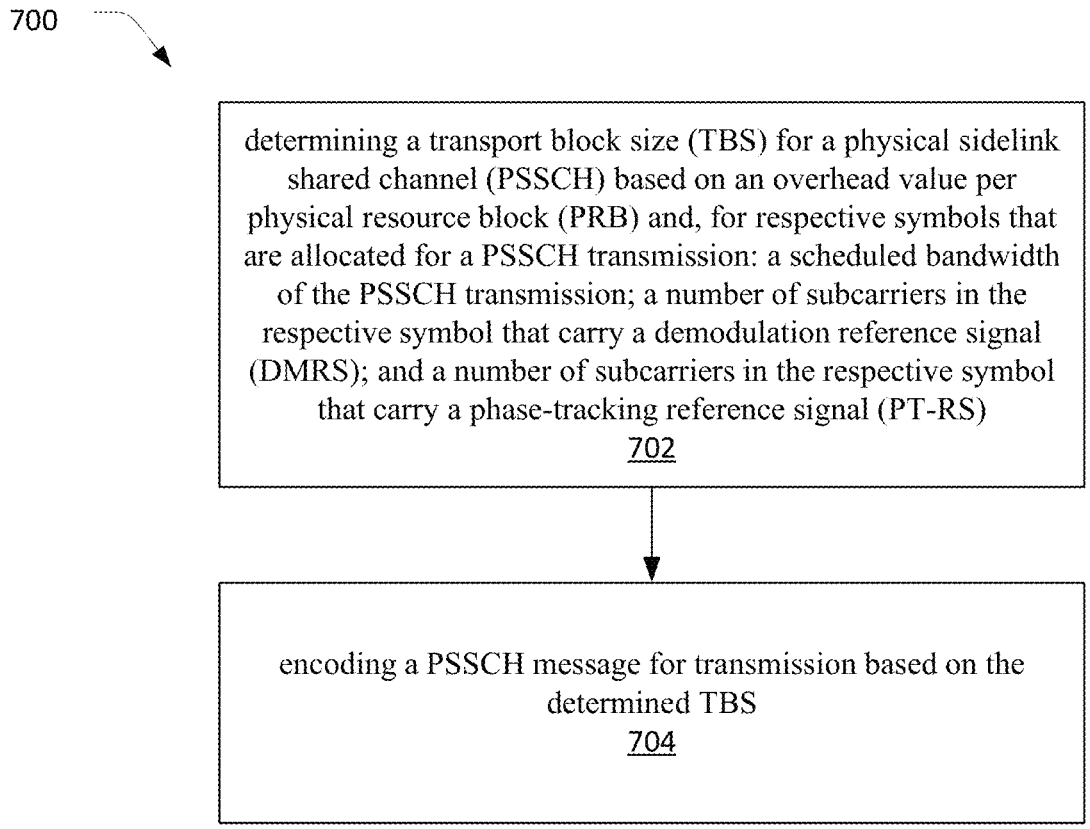
FIG. 7 is a flowchart of an example process that may be performed by a user equipment (UE), in accordance with various embodiments.

In some embodiments, the electronic device(s), network(s), system(s), chip(s) or component(s), or portions or implementations thereof, of FIGS. 4-6, or some other figure herein, may be configured to perform one or more processes, techniques, or methods as described herein, or portions thereof. One such process 700 is depicted in FIG. 7. In some embodiments, the process 700 may be performed by a UE (e.g., UE 402 and/or 502) or a portion thereof.

For example, the process 700 may include, at 702, determining a transport block size (TBS) for a physical sidelink shared channel (PSSCH) based on an overhead value per physical resource block (PRB) and, for respective symbols that are allocated for a PSSCH transmission: a scheduled bandwidth of the PSSCH transmission; a number of subcarriers in the respective symbol that carry a demodulation reference signal (DMRS); and a number of subcarriers in the respective symbol that carry a phase-tracking reference signal (PT-RS).

At 704, the process 700 may further include encoding a PSSCH message for transmission based on the determined TBS.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the PSSCH TBS determination scheme supporting the PSCCH not being present in each PRB
  a. The TBS determination scheme in 1, where the TBS is calculate without an intermediate step of calculating the PSSCH REs per PRB
  b. The TBS determination scheme in 1, where the TBS is calculated based in per PRB PSSCH resources including an allocation dependent overhead variable.

Example 2 may include the PSSCH TBS determination scheme taking into account resources that are possibly dynamically and possibly not deterministically allocated towards other functionalities
  c. The TBS determination scheme in 2, where the possibly different allocated resources are only taken into account when selecting the MCS in the transmitter
  d. The TBS determination scheme in 2, where this possibly allocated resources are taken into account by an overhead factor always subtracted from the available resources Example 3 may include the PSSCH TBS determination scheme taking into account the impact of AGC and Tx/Rx switching
  a. The TBS determination scheme in 3, where the AGC adaption is taken into account by removing this resource from the TBS determination completely
  b. The TBS determination scheme in 3, where the resources possibly impacted by the AGC adaptation is taken into account by an additional overhead factor
  c. The TBS determination scheme in 3, where the Tx/Rx switching gap is taken into account by removing this resource from the TBS determination completely
  d. The TBS determination scheme in 3, where the resources Tx/Rx switching gap is taken into account by an additional overhead factor Example 4 may include the PSSCH TBS determination scheme taking into account the uniform or non-uniform presence of the PSFCH
  a. The TBS determination scheme in 4, where either the presence of the PSFCH in every or in none of the slots is taking into account by determining the TBS from the remaining PSSCH resources
  b. The TBS determination scheme in 4, where the non-uniform presence of the PSFCH is taken into account by overwriting the amount of available PSSCH with a default value
  c. The TBS determination scheme in 4, where the non-uniform presence of the PSFCH is taken into account by including an additional overhead factor into the calculation of the available PSSCH resources
  d. The TBS determination scheme in 4, where the non-uniform presence of the PSFCH is taken into account via signaling the presence/no presence of this overhead in the TBS calculation is signaled in the SCI
  e. The TBS determination scheme in 4, where the non-uniform presence of the PSFCH is taken into account via knowing the presence from system perspective and all remaining transmission signal the first transmission. Therefore, enabling a correct recalculation of the TBS.

Example 5 may include the PSSCH TBS determination scheme for slot aggregation or concatenation, where all aggregated concatenated PSSCH resources are taken into account.

Example 6 may include the PSSCH TBS determination scheme for Variable slot structures where the variable slot configuration is taken into account with the same techniques as in 4.

Example 7 may include the PSSCH TBS determination scheme enabling transmissions where the first transmission has a code rate that is higher than 1
  a. The PSSCH TBS determination in 7, where a post calculation TBS scaling is applied
  b. The PSSCH TBS determination in 7, where before the available PSSCH resources are scaled
  c. The PSSCH TBS determination in 7, where a negative overhead is applied to the TBS overhead calculation.

Example 8 may include the PSSCH TBS determination scheme that determines the same TBS for multiple transmissions having a different number of resources allocated a. The TBS determination scheme in 8 where the amount of resources used for the calculation of the TBS is based on a predefined rule deriving it from multiple signaled resource allocations
b. The TBS determination scheme in 8 where the resources used for the calculation of the TBS are dynamically signaled
c. The TBS determination scheme in 8 where parameters used for the calculation of the TBS are agreed during unicast or multicast connection setup.

Example 9 may include the PSSCH TBS determination scheme handling unequal resource in different allocated sub-channels.
a. The TBS determination scheme in 9 where the additional available resource for the sub-channels with a larger amount of PRBs are not take into account for the TBS determination
b. The TBS determination scheme in 9 where additional smaller size sub-channels are not taken into account for the TBS determination.

Example 10 may include the PSSCH TBS determination scheme considering dynamically changing DMRS patterns for different transmissions of the same transport block.

Example 11 may include the PSSCH TBS determination scheme taking into account the presence of the 2nd stage PSCCH in the PSSCH resources.

Example A01 includes a PSSCH TBS determination scheme that supports a PSCCH not being present in each PRB.

Example A02 includes the PSSCH TBS determination scheme of example A01 and/or some other example(s) herein, further comprising: calculating a TBS without an intermediate step of calculating PSSCH REs per PRB.

Example A03 includes the PSSCH TBS determination scheme of example A01 and/or some other example(s) herein, further comprising: calculating the TBS based in per PRB PSSCH resources including an allocation dependent overhead variable.

Example B01 includes a PSSCH TBS determination scheme that takes into account resources that are possibly dynamically and possibly not deterministically allocated towards other functionalities.

Example B02 includes the PSSCH TBS determination scheme of example B01 and/or some other example(s) herein, wherein the possibly different allocated resources are only taken into account when selecting the MCS in the transmitter.

Example B03 includes the PSSCH TBS determination scheme of example B01 and/or some other example(s) herein, wherein the possibly allocated resources are taken into account by an overhead factor always subtracted from the available resources.

Example C01 includes a PSSCH TBS determination scheme taking into account an impact of AGC and Tx/Rx switching.

Example C02 includes the PSSCH TBS determination scheme of example C01 and/or some other example(s) herein, wherein AGC adaption is taken into account by removing this resource from the TBS determination completely.

Example C03 includes the PSSCH TBS determination scheme of example C01 and/or some other example(s) herein, wherein resources possibly impacted by the AGC adaptation is taken into account by an additional overhead factor.

Example C04 includes the PSSCH TBS determination scheme of example C01 and/or some other example(s) herein, wherein a Tx/Rx switching gap is taken into account by removing this resource from the TBS determination completely.

Example C05 includes the PSSCH TBS determination scheme of example C01 and/or some other example(s) herein, wherein resources Tx/Rx switching gap is taken into account by an additional overhead factor.

Example D01 includes a PSSCH TBS determination scheme taking into account uniform or non-uniform presence of a PSFCH.

Example D02 includes the PSSCH TBS determination scheme of example D01 and/or some other example(s) herein, wherein either the presence of the PSFCH in every or in none of the slots is taking into account by determining the TBS from the remaining PSSCH resources Example D03 includes the PSSCH TBS determination scheme of example D01 and/or some other example(s) herein, wherein the non-uniform presence of the PSFCH is taken into account by overwriting the amount of available PSSCH with a default value Example D04 includes the PSSCH TBS determination scheme of example D01 and/or some other example(s) herein, wherein the non-uniform presence of the PSFCH is taken into account by including an additional overhead factor into the calculation of the available PSSCH resources Example D05 includes the PSSCH TBS determination scheme of example D01 and/or some other example(s) herein, wherein the non-uniform presence of the PSFCH is taken into account via signaling the presence/no presence of this overhead in the TBS calculation is signaled in the SCI Example D06 includes the PSSCH TBS determination scheme of example D01 and/or some other example(s) herein, wherein the non-uniform presence of the PSFCH is taken into account via knowing the presence from system perspective and all remaining transmission signal the first transmission. Therefore, enabling a correct recalculation of the TBS Example E01 includes a PSSCH TBS determination scheme for slot aggregation or concatenation, wherein all aggregated concatenated PSSCH resources are taken into account.

Example F01 includes a PSSCH TBS determination scheme for Variable slot structures wherein a variable slot configuration is taken into account with the same techniques as in examples D01-D06.

Example G01 includes a PSSCH TBS determination scheme enabling transmissions wherein a first transmission has a code rate that is higher than 1.

Example G02 includes the PSSCH TBS determination scheme of example G01 and/or some other example(s) herein, wherein a post calculation TBS scaling is applied.

Example G03 includes the PSSCH TBS determination scheme of example G01 and/or some other example(s) herein, wherein before the available PSSCH resources are scaled.

Example G04 includes the PSSCH TBS determination scheme of example G01 and/or some other example(s) herein, wherein a negative overhead is applied to the TBS overhead calculation.

Example H01 includes a PSSCH TBS determination scheme that determines the same TBS for multiple transmissions having a different number of resources allocated.

Example H02 includes the PSSCH TBS determination scheme of example H01 and/or some other example herein, wherein the amount of resources used for the calculation of the TBS is based on a predefined rule deriving it from multiple signaled resource allocations.

Example H03 includes the PSSCH TBS determination scheme of example H01 and/or some other example herein, wherein the resources used for the calculation of the TBS are dynamically signaled.

Example H04 includes the PSSCH TBS determination scheme of example H01 and/or some other example herein, wherein parameters used for the calculation of the TBS are agreed during unicast or multicast connection setup.

Example I01 includes a PSSCH TBS determination scheme handling unequal resource in different allocated sub-channels.

Example I02 includes the PSSCH TBS determination scheme of example I01, wherein the additional available resource for the sub-channels with a larger amount of PRBs are not taken into account for the TBS determination.

Example I03 includes the PSSCH TBS determination scheme of example I01, wherein additional smaller size sub-channels are not taken into account for the TBS determination.

Example J01 may include one or more non-transitory, computer-readable media (NTCRM) having instructions, stored thereon, that when executed by one or more processors cause a user equipment (UE) to: determine a transport block size (TBS) for a physical sidelink shared channel (PSSCH) based on an overhead value per physical resource block (PRB) and, for respective symbols that are allocated for a PSSCH transmission:
a scheduled bandwidth of the PSSCH transmission;
a number of subcarriers in the respective symbol that carry a demodulation reference signal (DMRS); and
a number of subcarriers in the respective symbol that carry a phase-tracking reference signal (PT-RS); and
encode a PSSCH message for transmission based on the determined TBS.

Example J02 may include the one or more NTCRM of example J01, wherein the scheduled bandwidth of the PSSCH transmission is without remainder PRBs.

Example J03 may include the one or more NTCRM of example J01, wherein the instructions, when executed, are further to cause the UE to determine a second stage physical sidelink control channel (PSCCH) resource calculation based on the determined TBS.

Example J04 may include the one or more NTCRM of example J03, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) \right) - N_{oh}^{PRB} n_{PRB}$$

wherein:
$M_{sc}^{PSSCH}(l)$ is the scheduled bandwidth of the PSSCH transmission without remainder PRBs;

$M_{sc}^{DMRS}(l)$ is the number of subcarriers in OFDM symbol l that carry the DMRS in the PSSCH transmission assuming DMRS configuration with the most amount of resource elements (REs) configured for the resource pool assuming that the PSFCH is present if configured, in all PRBs except remainder PRBs;

$M_{sc}^{PT-RS}(l)$ is the number of subcarriers in OFDM symbol l that carry the PT-RS, in the PSSCH transmission in all PRBs except reminder PRBs;

$N_{symbol}^{PSSCH}$ is a number of allocated symbols for the PSSCH;

$N_{oh}^{PRB}$ is the overhead value per PRB overhead value preconfigured; and $n_{PRB}$ is a number of PRBs allocated to PSSCH excluding reminder PRBs.

Example J05 may include the one or more NTCRM of example J01, wherein the TBS is further determined based on a number of reserved resource elements that are reserved for a second stage physical sidelink control channel (PSCCH).

Example J06 may include the one or more NTCRM of claim 5, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) - M_{SC}^{SCI-2}(l) \right) - N_{oh}^{PRB} n_{PRB}$$

where:
$M_{sc}^{PSSCH}(l)$ is the scheduled bandwidth of the PSSCH transmission without remainder PRBs;

$M_{sc}^{DMRS}(l)$ is the number of subcarriers in OFDM symbol l that carry the DMRS in the PSSCH transmission assuming DMRS configuration with the most amount of resource elements (REs) configured for the resource pool assuming that the PSFCH is present if configured, in all PRBs except remainder PRBs;

$M_{sc}^{PT-RS}(l)$ is the number of subcarriers in OFDM symbol l that carry the PT-RS, in the PSSCH transmission in all PRBs except reminder PRBs;

$M_{SC}^{SCI-2}(l)$ is a number of subcarriers in OFDM symbol l that carry the 2nd stage PSCCH;

$N_{symbol}^{PSSCH}$ is a number of allocated symbols for the PSSCH;

$N_{oh}^{PRB}$ is the overhead value per PRB overhead value preconfigured; and $n_{PRB}$ is a number of PRBs allocated to PSSCH excluding reminder PRBs.

Example J07 may include the one or more NTCRM of example J01, wherein the number of the symbols that are allocated for the PSSCH is determined based on a determination that a physical sidelink feedback channel is configured and is to be present in all slots.

Example J08 may include an apparatus to be implemented in a user equipment (UE), the apparatus comprising: a radio frequency (RF) interface; and processing circuitry coupled to the RF interface. The processing circuitry is to: determine a transport block size (TBS) for a physical sidelink shared channel (PSSCH) based on an overhead value per physical resource block (PRB) and, for respective symbols that are allocated for a PSSCH transmission:

a scheduled bandwidth of the PSSCH transmission;
a number of subcarriers in the respective symbol that carry a demodulation reference signal (DMRS); and
a number of subcarriers in the respective symbol that carry a phase-tracking reference signal (PT-RS); and
encode, based on the determined TBS, a PSSCH message for transmission via the RF interface.

Example J09 may include the apparatus of example J08, wherein the scheduled bandwidth of the PSSCH transmission is without remainder PRBs.

Example J10 may include the apparatus of example J08, wherein the processing circuitry is further to determine a second stage physical sidelink control channel (PSCCH) resource calculation based on the determined TBS.

Example J11 may include the apparatus of example J10, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) \right) - N_{oh}^{PRB} n_{PRB}$$

wherein:

$M_{sc}^{PSSCH}(l)$ is the scheduled bandwidth of the PSSCH transmission without remainder PRBs;

$M_{sc}^{DMRS}(l)$ is the number of subcarriers in OFDM symbol l that carry the DMRS in the PSSCH transmission assuming DMRS configuration with the most amount of resource elements (REs) configured for the resource pool assuming that the PSFCH is present if configured, in all PRBs except remainder PRBs;

$M_{sc}^{PT-RS}(l)$ is the number of subcarriers in OFDM symbol l that carry the PT-RS, in the PSSCH transmission in all PRBs except reminder PRBs;

$N_{symbol}^{PSSCH}$ is a number of allocated symbols for the PSSCH;

$N_{oh}^{PRB}$ is the overhead value per PRB overhead value preconfigured; and $n_{PRB}$ is a number of PRBs allocated to PSSCH excluding reminder PRBs.

Example J12 may include the apparatus of example J08, wherein the TBS is further determined based on a number of reserved resource elements that are reserved for a second stage physical sidelink control channel (PSCCH).

Example J13 may include the apparatus of example J12, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) - M_{SC}^{SCI-2}(l) \right) - N_{oh}^{PRB} n_{PRB}$$

where:

$M_{sc}^{PSSCH}(l)$ is the scheduled bandwidth of the PSSCH transmission without remainder PRBs;

$M_{sc}^{DMRS}(l)$ is the number of subcarriers in OFDM symbol l that carry the DMRS in the PSSCH transmission assuming DMRS configuration with the most amount of resource elements (REs) configured for the resource pool assuming that the PSFCH is present if configured, in all PRBs except remainder PRBs;

$M_{sc}^{PT-RS}(l)$ is the number of subcarriers in OFDM symbol l that carry the PT-RS, in the PSSCH transmission in all PRBs except reminder PRBs;

$M_{sc}^{SCI-2}(l)$ is a number of subcarriers in OFDM symbol l that carry the 2nd stage PSCCH;

$N_{symbol}^{PSSCH}$ is a number of allocated symbols for the PSSCH;

$N_{oh}^{PRB}$ is the overhead value per PRB overhead value preconfigured; and $n_{PRB}$ is a number of PRBs allocated to PSSCH excluding reminder PRBs.

Example J14 may include the apparatus of example J08, wherein the number of the symbols that are allocated for the PSSCH is determined based on a determination that a physical sidelink feedback channel is configured and is to be present in all slots.

Example J15 may include one or more non-transitory, computer-readable media (NTCRM) having instructions, stored thereon, that when executed by one or more processors cause a user equipment (UE) to: determine a number of subcarriers, in respective symbols of a set of symbols that are allocated for physical sidelink shared channel (PSSCH) transmission, that are reserved for a second stage physical sidelink control channel (PSCCH); determine a transport block size (TBS) for the physical sidelink shared channel (PSSCH) based on the determined number of subcarriers; and encode a PSSCH message for transmission based on the determined TBS.

Example J16 may include the one or more NTCRM of example J15, wherein the TBS is determined based further on based on an overhead value per physical resource block (PRB).

Example J17 may include the one or more NTCRM of example J16, wherein the TBS is determined based further on, for the respective symbols of the set of symbols that are allocated for the PSSCH transmission: a scheduled bandwidth of the PSSCH transmission; a number of subcarriers in the respective symbol that carry a demodulation reference signal (DMRS); and a number of subcarriers in the respective symbol that carry a phase-tracking reference signal (PT-RS).

Example J18 may include the one or more NTCRM of example J15, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) - M_{SC}^{SCI-2}(l) \right) - N_{oh}^{PRB} n_{PRB}$$

wherein:

$M_{sc}^{PSSCH}(l)$ is a scheduled bandwidth of the PSSCH transmission without remainder PRBs;

$M_{sc}^{DMRS}(l)$ is a number of subcarriers in OFDM symbol l that carry the DMRS in the PSSCH transmission assuming DMRS configuration with the most amount of resource elements (REs) configured for the resource pool assuming that the PSFCH is present if configured, in all PRBs except reminder PRBs;

$M_{sc}^{PT-RS}(l)$ is a number of subcarriers in OFDM symbol l that carry the PT-RS, in the PSSCH transmission in all PRBs except reminder PRBs;

$M_{SC}^{SCI-2}(l)$ is the number of subcarriers in OFDM symbol l that are allocated for the second stage PSCCH;

$N_{symbol}^{PSSCH}$ is a number of allocated symbols for the PSSCH;

$N_{oh}^{PRB}$ is the overhead value per PRB overhead value preconfigured; and $n_{PRB}$ is a number of PRBs allocated to PSSCH excluding reminder PRBs.

Example J19 may include the one or more NTCRM of example J15, wherein the number of the symbols that are allocated for the PSSCH is determined based on a determination that a physical sidelink feedback channel is configured and is to be present in all slots.

Example Z01 may include an apparatus comprising means to perform one or more elements of a method described in or related to any of examples 1-11, A01-A03, B01-B03, C01-C05, D01-D06, E01, F01, G01-G04, H01-H04, I01-I103, J01-J19, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-11, A01-A03, B01-B03, C01-C05, D01-D06, E01, F01, G01-G04, H01-H04, J01-I03, J01-J19, or any other method or process described herein.

Example Z03 may include an apparatus comprising logic, modules, or circuitry to perform one or more elements of a method described in or related to any of examples 1-11, A01-A03, B01-B03, C01-C05, D01-D06, E01, F01, G01-G04, H01-H04, I01-I03, J01-J19, or any other method or process described herein.

Example Z04 may include a method, technique, or process as described in or related to any of examples 1-11, A01-A03, B01-B03, C01-C05, D01-D06, E01, F01, G01-G04, H01-H04, J01-I03, J01,119, or portions or parts thereof Example Z05 may include an apparatus comprising: one or more processors and one or more computer-readable media comprising instructions that, when executed by the one or more processors, cause the one or more processors to perform the method, techniques, or process as described in or related to any of examples 1-11, A01-A03, B01-B03, C01-C05, D01-D06, E01, F01, G01-G04, H01-H04, J01-I03, J01-J19, or portions thereof.

Example Z06 may include a signal as described in or related to any of examples 1-11, A01-A03, B01-B03, C01-C05, D01-D06, E01, F01, G01-G04, H01-H04, I01-I03, J01-J19, or portions or parts thereof.

Example Z07 may include a datagram, packet, frame, segment, protocol data unit (PDU), or message as described in or related to any of examples 1-11, A01-A03, B01-B03, C01-C05, D01-D06, E01, F01, G01-G04, H01-H04, I01-I03, J01-J19, or portions or parts thereof, or otherwise described in the present disclosure.

Example Z08 may include a signal encoded with data as described in or related to any of examples 1-11, A01-A03, B01-B03, C01-C05, D01-D06, E01, F01, G01-G04, H01-H04, I01-I03, J01-J19, or portions or parts thereof, or otherwise described in the present disclosure.

Example Z09 may include a signal encoded with a datagram, packet, frame, segment, protocol data unit (PDU), or message as described in or related to any of examples 1-11, A01-A03, B01-B03, C01-C05, D01-D06, E01, F01, G01-G04, H01-H04, I01-I03, J01-J19, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-11, A01-A03, B01-B03, C01-C05, D01-D06, E01, F01, G01-G04, H01-H04, J01-I03, J01-J19, or portions thereof Example Z11 may include a computer program comprising instructions, wherein execution of the program by a processing element is to cause the processing element to carry out the method, techniques, or process as described in or related to any of examples 1-11, A01-A03, B01-B03, C01-C05, D01-D06, E01, F01, G01-G04, H01-H04, I01-I03, J01-J19, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | | |
|---|---|---|
| 3GPP Third Generation Partnership Project | ASN.1 Abstract Syntax Notation One | Certification Authority |
| 4G Fourth Generation | AUSF Authentication Server Function | CAPEX CAPital Expenditure |
| 5G Fifth Generation | | |
| 5GC 5G Core network | AWGN Additive White Gaussian Noise | CBRA Contention Based Random Access |
| ACK Acknowledgement | | |
| AF Application Function | BAP Backhaul Adaptation Protocol | CC Component Carrier, Country Code, Cryptographic Checksum |
| AM Acknowledged Mode | | |
| | BCH Broadcast Channel | |
| AMBR Aggregate | BER Bit Error Ratio | CCA Clear Channel |

| | | |
|---|---|---|
| Maximum Bit Rate | BFD Beam Failure | Assessment |
| AMF Access and Mobility Management Function | Detection | CCE Control Channel Element |
| | BLER Block Error Rate | |
| | BPSK Binary Phase Shift Keying | CCCH Common Control Channel |
| AN Access Network | BRAS Broadband Remote Access Server | CE Coverage Enhancement |
| ANR Automatic Neighbour Relation | BSS Business Support System | CDM Content Delivery Network |
| AP Application Protocol, Antenna Port, Access Point | BS Base Station | CDMA Code-Division Multiple Access |
| | BSR Buffer Status Report | |
| API Application Programming Interface | BW Bandwidth | CFRA Contention Free Random Access |
| APN Access Point Name | BWP Bandwidth Part | |
| ARP Allocation and Retention Priority | C-RNTI Cell Radio Network Temporary Identity | CG Cell Group |
| | | CI Cell Identity |
| ARQ Automatic Repeat Request | | CID Cell-ID (e.g., positioning method) |
| | CA Carrier Aggregation, | |
| AS Access Stratum | | CIM Common Information Model |
| CIR Carrier to Interference Ratio | CPU CSI processing unit, Central Processing Unit | CSI-RSRQ reference signal received quality |
| CK Cipher Key | | |
| CM Connection Management, Conditional Mandatory | C/R Command/Response field bit | CSI-SINR CSI signal-to-noise and interference ratio |
| CMAS Commercial Mobile Alert Service | CRAN Cloud Radio Access Network, Cloud RAN | CSMA Carrier Sense Multiple Access |
| CMD Command | | CSMA/CA CSMA with collision avoidance |
| CMS Cloud Management System | CRB Common Resource Block | CSS Common Search Space, Cell-specific Search Space |
| CO Conditional Optional | CRC Cyclic Redundancy Check | |
| COMP Coordinated Multi-Point | CRI Channel-State Information Resource Indicator, CSI-RS Resource Indicator | CTS Clear-to-Send |
| | | CW Codeword |
| CORESET Control Resource Set | | CWS Contention Window Size |
| COTS Commercial Off-The-Shelf | C-RNTI Cell RNTI | D2D Device-to-Device |
| | CS Circuit Switched | DC Dual Connectivity, Direct Current |
| CP Control Plane, Cyclic Prefix, Connection Point | CSAR Cloud Service Archive | |
| | | DCI Downlink Control Information |
| | CSI Channel-State Information | |
| CPD Connection Point Descriptor | | DF Deployment Flavour |
| | CSI-IM CSI Interference Measurement | |
| CPE Customer Premise Equipment | | DL Downlink |
| | | DMTF Distributed Management Task Force |
| CPICH Common Pilot Channel | CSI-RS CSI Reference Signal | |
| | | DPDK Data Plane Development Kit |
| CQI Channel Quality Indicator | CSI-RSRP CSI reference signal received power Management Function | |
| DM-RS, DMRS Demodulation Reference Signal | | EREG enhanced REG, enhanced resource element groups |
| | EGPRS Enhanced GPRS | ETSI European Telecommunications Standards Institute |
| DN Data network | | |
| DRB Data Radio Bearer | EIR Equipment Identity Register | |
| DRS Discovery Reference Signal | | |
| | eLAA enhanced Licensed Assisted Access, enhanced LAA | ETWS Earthquake and Tsunami Warning System |
| DRX Discontinuous Reception | | |
| DSL Domain Specific Language. Digital Subscriber Line | EM Element Manager | eUICC embedded UICC, embedded Universal Integrated Circuit Card |
| | eMBB Enhanced Mobile Broadband | |
| DSLAM DSL Access Multiplexer | EMS Element Management System | E-UTRA Evolved UTRA |
| DwPTS Downlink Pilot Time Slot | eNB evolved NodeB, E-UTRAN Node B | E-UTRAN Evolved UTRAN |
| E-LAN Ethernet Local Area Network | EN-DC E-UTRA-NR Dual Connectivity | EV2X Enhanced V2X |
| | | F1AP F1 Application Protocol |
| E2E End-to-End | | |
| ECCA extended clear channel assessment, extended CCA | EPC Evolved Packet Core | F1-C F1 Control plane interface |
| | EPDCCH enhanced PDCCH, enhanced Physical Downlink Control Cannel | F1-U F1 User plane interface |
| ECCE Enhanced Control Channel Element, Enhanced CCE | | FACCH Fast Associated Control CHannel |
| ED Energy Detection | EPRE Energy per resource element | |
| EDGE Enhanced Datarates for GSM Evolution | | FACCH/F Fast Associated Control |
| | EPS Evolved Packet | |

-continued

| | | |
|---|---|---|
| (GSM Evolution) | System | Channel/Full rate |
| EGMF Exposure Governance | | |
| FACCH/H Fast Associated Control Channel/Half rate | FN Frame Number FPGA Field-Programmable Gate Array | GNSS Global Navigation Satellite System GPRS General Packet Radio Service |
| FACH Forward Access Channel | FR Frequency Range | GSM Global System for Mobile |
| FAUSCH Fast Uplink Signalling Channel | G-RNTI GERAN Radio Network Temporary Identity | Communications, Groupe Special Mobile |
| FB Functional Block | | |
| FBI Feedback Information | GERAN GSM EDGE RAN, | GTP GPRS Tunneling Protocol |
| FCC Federal Communications Commission | GSM EDGE Radio Access Network GGSN Gateway GPRS Support Node | GTP-U GPRS Tunnelling Protocol for User Plane |
| FCCH Frequency Correction CHannel | GLONASS GLObal'naya | GTS Go To Sleep Signal (related to WUS) |
| FDD Frequency Division Duplex | NAvigatsionnaya Sputnikovaya | GUMMEI Globally Unique MME Identifier |
| FDM Frequency Division Multiplex | Sistema (Engl.: Global Navigation | GUTI Globally Unique Temporary UE Identity |
| FDMA Frequency Division Multiple Access | Satellite System) gNB Next Generation | HARQ Hybrid ARQ, Hybrid Automatic |
| FE Front End FEC Forward Error Correction | NodeB gNB-CU gNB-centralized unit, Next | Repeat Request HANDO Handover HFN HyperFrame |
| FFS For Further Study FFT Fast Fourier Transformation | Generation NodeB centralized unit gNB-DU gNB- | Number HHO Hard Handover HLR Home Location |
| feLAA further enhanced Licensed Assisted Access, further enhanced LAA | distributed unit, Next Generation NodeB distributed unit | Register HN Home Network HO Handover |
| HPLMN Home Public Land Mobile Network | IDFT Inverse Discrete Fourier Transform IE Information | IMPU IP Multimedia PUblic identity IMS IP Multimedia Subsystem |
| HSDPA High Speed Downlink Packet Access | element IBE In-Band Emission | IMSI International Mobile Subscriber Identity |
| HSN Hopping Sequence Number | IEEE Institute of Electrical and Electronics | IoT Internet of Things |
| HSPA High SPeed Packet Access | Engineers IEI Information | IP Internet Protocol Ipsec IP Security, |
| HSS Home Subscriber Server | Element Identifier IEIDL Information | Internet Protocol Security |
| HSUPA High Speed Uplink Packet Access | Element Identifier Data Length | IP-CAN IP-Connectivity Access |
| HTTP Hyper Text Transfer Protocol | IETF Internet Engineering Task | Network IP-M IP Multicast |
| HTTPS Hyper Text Transfer Protocol Secure (https is http/1.1 over SSL, i.e. port 443) | Force IF Infrastructure IM Interference Measurement, Intermodulation, IP | IPV4 Internet Protocol Version 4 IPV6 Internet Protocol Version 6 IR Infrared |
| I-Block Information Block | Multimedia IMC IMS Credentials | IS In Sync IRP Integration |
| ICCID Integrated Circuit Card Identification | IMEI International Mobile Equipment | Reference Point ISDN Integrated Services |
| IAB Integrated Access and Backhaul | Identity IMGI International | Digital Network ISIM IM Services |
| ICIC Inter-Cell Interference Coordination | mobile group identity IMPI IP Multimedia Private Identity | Identity Module ISO International Organisation for |
| ID Identity, identifier | | Standardisation |
| ISP Internet Service Provider | L2 Layer 2 (data link layer) | LWIP LTE/WLAN Radio Level Integration with |
| IWF Interworking-Function | L3 Layer 3 (network layer) | IPsec Tunnel LTE Long Term |
| I-WLAN Interworking WLAN | LAA Licensed Assisted Access LAN Local Area | Evolution M2M Machine-to-Machine |
| Constraint length of the convolutional code, | Network LBT Listen Before Talk | MAC Medium Access Control (protocol |
| USIM Individual key kB Kilobyte (1000 bytes) | LCM LifeCycle Management LCR Low Chip Rate | layering context) MAC Message authentication code |
| kbps kilo-bits per second | LCS Location Services | (security/encryption |
| Kc Ciphering key | LCID Logical | context) |

-continued

Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power service Single Frequency Network
MCC Mobile Country Code
MCG Master Cell Group
MCOTMaximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
NAS Non-Access Stratum, Non- Access Stratum layer
NCT Network Connectivity Topology
NC-JT Non- Coherent Joint Transmission
NEC Network Capability Exposure
NE-DC NR-E- UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
OFDMA Orthogonal Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation MM Mobility Management
MME Mobility Management Entity
MN Master Node
MnS Management Service
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
NMS Network Management System
N-POP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
PCF Policy Control MAC-A MAC used for authentication and key agreement (TSG T WG3 context)
MAC-IMAC used for data integrity of signalling messages (TSG T WG3 context)
MANO Management and Orchestration
MBMS Multimedia Broadcast and Multicast Service
MBSFN Multimedia Broadcast multicast MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTCmassive MTC, massive Machine-Type Communications
MU-MIMO Multi User MIMO
MWUS MTC wake- up signal, MTC WUS
NACK Negative Acknowledgement
NAI Network Access Identifier
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single- NSSAI
NSSF Network Slice Selection Function
NW Network
NWUSNarrowband wake- up signal, Narrowband WUS
NZP Non-Zero Power
O&M Operation and Maintenance
ODU2 Optical channel Data Unit-type 2
OFDM Orthogonal Frequency Division Multiplexing PLMN Public Land Mobile

| | | |
|---|---|---|
| Frequency Division Multiple Access | Function PCRF Policy Control and | Network PIN Personal |
| OOB Out-of-band | Charging Rules | Identification Number |
| OOS Out of Sync | Function | PM Performance |
| OPEX OPerating EXpense | PDCP Packet Data | Measurement |
| OSI Other System Information | Convergence Protocol, Packet Data | PMI Precoding Matrix Indicator |
| OSS Operations Support System | Convergence Protocol layer | PNF Physical Network Function |
| OTA over-the-air | PDCCH Physical | PNFD Physical Network |
| PAPR Peak-to-Average Power Ratio | Downlink Control Channel | Function Descriptor PNFR Physical Network |
| PAR Peak to Average Ratio | PDCP Packet Data Convergence Protocol | Function Record POC PTT over Cellular |
| PBCH Physical Broadcast Channel | PDN Packet Data Network, Public Data | PP, PTP Point-to-Point |
| PC Power Control, Personal Computer | Network PDSCH Physical | PPP Point-to-Point Protocol |
| PCC Primary Component Carrier, Primary CC | Downlink Shared Channel PDU Protocol Data Unit | PRACH Physical RACH PRB Physical resource |
| PCell Primary Cell | PEI Permanent | block |
| PCI Physical Cell ID, Physical Cell Identity | Equipment Identifiers PFD Packet Flow Description | PRG Physical resource block group ProSe Proximity Services, |
| PCEF Policy and Charging Enforcement Function | P-GW PDN Gateway PHICH Physical hybrid-ARQ indicator channel PHY Physical layer | Proximity-Based Service PRS Positioning Reference Signal |
| PRR Packet Reception Radio | PUSCH Physical Uplink Shared | RAR Random Access Response |
| PS Packet Services | Channel | RAT Radio Access |
| PSBCH Physical Sidelink Broadcast Channel | QAM Quadrature Amplitude Modulation QCI QOS class of | Technology RAU Routing Area Update |
| PSDCH Physical Sidelink Downlink Channel | identifier QCL Quasi co-location QFI QOS Flow ID, QoS | RB Resource block, Radio Bearer RBG Resource block |
| PSCCH Physical Sidelink Control Channel | Flow Identifier QOS Quality of Service QPSK Quadrature | group REG Resource Element Group |
| PSFCH Physical Sidelink Feedback Channel | (Quaternary) Phase Shift Keying QZSS Quasi-Zenith | Rel Release REQ REQuest RF Radio Frequency |
| PSSCH Physical Sidelink Shared Channel | Satellite System RA-RNTI Random Access RNTI | RI Rank Indicator RIV Resource indicator value |
| PSCell Primary SCell PSS Primary Synchronization Signal | RAB Radio Access Bearer, Random Access Burst | RL Radio Link RLC Radio Link Control, Radio Link |
| PSTN Public Switched Telephone Network | RACH Random Access Channel RADIUS Remote | Control layer RLC AM RLC Acknowledged Mode |
| PT-RS Phase-tracking reference signal | Authentication Dial In User Service | RLC UM RLC Unacknowledged Mode |
| PTT Push-to-Talk PUCCH Physical | RAN Radio Access Network | RLF Radio Link Failure RLM Radio Link |
| Uplink Control Channel | RAND RANDom number (used for authentication) | Monitoring RLM-RS Reference Signal for RLM |
| RM Registration Management | RTP Real Time Protocol RTS Ready-To-Send | SCell Secondary Cell SC-FDMA Single |
| RMC Reference Measurement Channel | RTT Round Trip Time Rx Reception, | Carrier Frequency Division Multiple |
| RMSI Remaining MSI, Remaining Minimum System Information | Receiving, Receiver S1AP S1 Application Protocol | Access SCG Secondary Cell Group |
| RN Relay Node RNC Radio Network Controller | S1-MME S1 for the control plane S1-U S1 for the user | SCM Security Context Management SCS Subcarrier Spacing |
| RNL Radio Network Layer | plane S-GW Serving Gateway | SCTP Stream Control Transmission |
| RNTI Radio Network Temporary Identifier | S-RNTI SRNC Radio Network | Protocol SDAP Service Data |
| ROHC RObust Header Compression | Temporary Identity S-TMSI SAE | Adaptation Protocol, Service Data Adaptation |
| RRC Radio Resource Control, Radio | Temporary Mobile Station Identifier | Protocol layer SDL Supplementary |

| | | |
|---|---|---|
| Resource Control layer | SA Standalone | Downlink |
| RRM Radio Resource | operation mode | SDNF Structured Data |
| Management | SAE System | Storage Network |
| RS Reference Signal | Architecture Evolution | Function |
| RSRP Reference Signal | SAP Service Access | SDP Session Description |
| Received Power | Point | Protocol |
| RSRQ Reference Signal | SAPD Service Access | SDSF Structured Data |
| Received Quality | Point Descriptor | Storage Function |
| RSSI Received Signal | SAPI Service Access | SDU Service Data Unit |
| Strength Indicator | Point Identifier | SEAF Security Anchor |
| RSU Road Side Unit | SCC Secondary | Function |
| RSTD Reference Signal | Component Carrier, | SeNB secondary eNB |
| Time difference | Secondary CC | |
| SEPP Security Edge | SMF Session | SS-RSRP |
| Protection Proxy | Management Function | Synchronization |
| SFI Slot format | SMS Short Message | Signal based Reference |
| indication | Service | Signal Received |
| SFTD Space-Frequency | SMSF SMS Function | Power |
| Time Diversity, SFN and | SMTC SSB-based | SS-RSRQ |
| frame timing difference | Measurement Timing | Synchronization |
| SFN System Frame | Configuration | Signal based Reference |
| Number or | SN Secondary Node, | Signal Received |
| Single Frequency | Sequence Number | Quality |
| Network | SoC System on Chip | SS-SINR |
| SgNB Secondary gNB | SON Self-Organizing | Synchronization |
| SGSN Serving GPRS | Network | Signal based Signal to |
| Support Node | SpCell Special Cell | Noise and Interference |
| S-GW Serving Gateway | SP-CSI-RNTISemi- | Ratio |
| SI System Information | Persistent CSI RNTI | SSS Secondary |
| SI-RNTI System | SPS Semi-Persistent | Synchronization |
| Information RNTI | Scheduling | Signal |
| SIB System Information | SQN Sequence number | SSSG Search Space Set |
| Block | SR Scheduling Request | Group |
| SIM Subscriber Identity | SRB Signalling Radio | SSSIF Search Space Set |
| Module | Bearer | Indicator |
| SIP Session Initiated | SRS Sounding | SST Slice/Service Types |
| Protocol | Reference Signal | SU-MIMO Single User |
| SiP System in Package | SS Synchronization | MIMO |
| SL Sidelink | Signal | SUL Supplementary |
| SLA Service Level | SSB SS Block | Uplink |
| Agreement | SSBRI SSB Resource | TA Timing Advance, |
| SM Session | Indicator | Tracking Area |
| Management | SSC Session and Service | TAC Tracking Area |
| | Continuity | Code |
| TAG Timing Advance | TPMI Transmitted | UDP User Datagram |
| Group | Precoding Matrix | Protocol |
| TAU Tracking Area | Indicator | UDR Unified Data |
| Update | TR Technical Report | Repository |
| TB Transport Block | TRP, TRxP | UDSF Unstructured Data |
| TBS Transport Block | Transmission | Storage Network |
| Size | Reception Point | Function |
| TBD To Be Defined | TRS Tracking Reference | UICC Universal |
| TCI Transmission | Signal | Integrated Circuit Card |
| Configuration Indicator | TRx Transceiver | UL Uplink |
| TCP Transmission | TS Technical | UM Unacknowledged |
| Communication | Specifications, | Mode |
| Protocol | Technical Standard | UML Unified Modelling |
| TDD Time Division | TTI Transmission Time | Language |
| Duplex | Interval | UMTS Universal Mobile |
| TDM Time Division | Tx Transmission, | Telecommunications |
| Multiplexing | Transmitting, | System |
| TDMA Time Division | Transmitter | UP User Plane |
| Multiple Access | U-RNTI UTRAN | UPF User Plane |
| TE Terminal | Radio Network | Function |
| Equipment | Temporary Identity | URI Uniform Resource |
| TEID Tunnel End Point | UART Universal | Identifier |
| Identifier | Asynchronous | URL Uniform Resource |
| TFT Traffic Flow | Receiver and | Locator |
| Template | Transmitter | URLLC Ultra- |
| TMSI Temporary Mobile | UCI Uplink Control | Reliable and Low |
| Subscriber Identity | Information | Latency |
| TNL Transport Network | UE User Equipment | USB Universal Serial |
| Layer | UDM Unified Data | Bus |
| TPC Transmit Power | Management | USIM Universal |
| Control | | Subscriber Identity Module |
| USS UE-specific search | VLAN Virtual LAN, | VRB Virtual Resource |
| space | Virtual Local Area | Block |
| UTRA UMTS Terrestrial | Network | WiMAX Worldwide |
| Radio Access | VM Virtual Machine | Interoperability for |

| | | |
|---|---|---|
| UTRAN Universal Terrestrial Radio Access Network | VNF Virtualized Network Function | Microwave Access WLAN Wireless Local Area Network |
| UwPTS Uplink Pilot Time Slot | VNFFG VNF Forwarding Graph VNFFGD VNF | WMAN Wireless Metropolitan Area Network |
| V2I Vehicle-to-Infrastructure | Forwarding Graph Descriptor | WPAN Wireless Personal Area Network |
| V2P Vehicle-to-Pedestrian | VNFM VNF Manager VoIP Voice-over-IP, | X2-C X2-Control plane |
| V2V Vehicle-to-Vehicle | Voice-over-Internet | X2-U X2-User plane |
| V2X Vehicle-to-everything | Protocol VPLMN Visited | XML extensible Markup Language |
| VIM Virtualized Infrastructure Manager | Public Land Mobile Network | XRES EXpected user RESponse |
| VL Virtual Link, | VPN Virtual Private Network | XOR exclusive OR ZC Zadoff-Chu ZP Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory, computer-readable media (NTCRM) having instructions, stored thereon, that when executed by one or more processors cause a user equipment (UE) to:
   determine a transport block size (TBS) for a physical sidelink shared channel (PSSCH) based on an overhead value per physical resource block (PRB) and, for respective symbols that are allocated for a PSSCH transmission:
     a scheduled bandwidth of the PSSCH transmission;
     a number of subcarriers in the respective symbol that carry a demodulation reference signal (DMRS); and
     a number of subcarriers in the respective symbol that carry a phase-tracking reference signal (PT-RS); and
   encode a PSSCH message for transmission based on the determined TBS.

2. The one or more NTCRM of claim 1, wherein the scheduled bandwidth of the PSSCH transmission is without remainder PRBs.

3. The one or more NTCRM of claim 1, wherein the instructions, when executed, are further to cause the UE to determine a second stage physical sidelink control channel (PSCCH) resource calculation based on the determined TBS.

4. The one or more NTCRM of claim 3, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) \right) - N_{oh}^{PRB} n_{PRB}$$

wherein:
$M_{sc}^{PSSCH}(l)$ is the scheduled bandwidth of the PSSCH transmission without remainder PRBs;
$M_{sc}^{DMRS}(l)$ is the number of subcarriers in orthogonal frequency division multiplexing (OFDM) symbol that carry the DMRS in the PSSCH transmission assuming DMRS configuration with the most amount of resource elements (REs) configured for the resource pool, and assuming that a physical sidelink feedback channel (PSFCH) is present if configured, in all PRBs except remainder PRBs;
$M_{sc}^{PT-RS}(l)$ is the number of subcarriers in OFDM symbol l that carry the PT-RS, in the PSSCH transmission in all PRBs except remainder PRBs;
$N_{symbol}^{PSSCH}$ is a number of allocated symbols for the PSSCH;
$N_{oh}^{PRB}$ is the overhead value per PRB overhead value preconfigured; and $n_{PRB}$ is a number of PRBs allocated to PSSCH excluding remainder PRBs.

5. The one or more NTCRM of claim 1, wherein the TBS is further determined based on a number of reserved resource elements that are reserved for a second stage physical sidelink control channel (PSCCH).

6. The one or more NTCRM of claim 5, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) - M_{SC}^{SCI-2}(l) \right) - N_{oh}^{PRB} n_{PRB}$$

where:
$M_{sc}^{PSSCH}(l)$ is the scheduled bandwidth of the PSSCH transmission without remainder PRBs;
$M_{sc}^{DMRS}(l)$ is the number of subcarriers in orthogonal frequency division multiplexing (OFDM) symbol that carry the DMRS in the PSSCH transmission, assuming DMRS configuration with the most amount of resource elements (REs) configured for the resource pool, and assuming that a physical sidelink feedback channel (PSFCH) is present if configured, in all PRBs except remainder PRBs;
$M_{sc}^{PT-RS}(l)$ is the number of subcarriers in OFDM symbol l that carry the PT-RS, in the PSSCH transmission in all PRBs except remainder PRBs;
$M_{SC}^{SCI-2}(l)$ is a number of subcarriers in OFDM symbol l that carry the 2nd stage PSCCH;
$N_{symbol}^{PSSCH}$ is a number of allocated symbols for the PSSCH;
$N_{ch}^{PRB}$ is the overhead value per PRB overhead value preconfigured; and
$n_{PRB}$ is a number of PRBs allocated to PSSCH excluding remainder PRBs.

7. The one or more NTCRM of claim 1, wherein the number of the symbols that are allocated for the PSSCH is determined based on a determination that a physical sidelink feedback channel is configured and is to be present in all slots.

8. An apparatus to be implemented in a user equipment (UE), the apparatus comprising:
a radio frequency (RF) interface; and
processing circuitry coupled to the RF interface, the processing circuitry to:
determine a transport block size (TBS) for a physical sidelink shared channel (PSSCH) based on an overhead value per physical resource block (PRB) and, for respective symbols that are allocated for a PSSCH transmission:
a scheduled bandwidth of the PSSCH transmission;
a number of subcarriers in the respective symbol that carry a demodulation reference signal (DMRS); and
a number of subcarriers in the respective symbol that carry a phase-tracking reference signal (PT-RS); and
encode, based on the determined TBS, a PSSCH message for transmission via the RF interface.

9. The apparatus of claim 8, wherein the scheduled bandwidth of the PSSCH transmission is without remainder PRBs.

10. The apparatus of claim 8, wherein the processing circuitry is further to determine a second stage physical sidelink control channel (PSCCH) resource calculation based on the determined TBS.

11. The apparatus of claim 10, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) \right) - N_{oh}^{PRB} n_{PRB}$$

wherein:
$M_{sc}^{PSSCH}(l)$ is the scheduled bandwidth of the PSSCH transmission without remainder PRBs;
$M_{sc}^{DMRS}(l)$ is the number of subcarriers in orthogonal frequency division multiplexing (OFDM) symbol l that carry the DMRS in the PSSCH transmission, assuming DMRS configuration with the most amount of resource elements (REs) configured for the resource pool, and assuming that a physical sidelink feedback channel (PSFCH) is present if configured, in all PRBs except remainder PRBs;
$M_{sc}^{PT-RS}(l)$ is the number of subcarriers in OFDM symbol that carry the PT-RS, in the PSSCH transmission in all PRBs except remainder PRBs;
$N_{symbol}^{PSSCH}$ is a number of allocated symbols for the PSSCH;
$N_{oh}^{PRB}$ is the overhead value per PRB overhead value preconfigured; and
$n_{PRB}$ is a number of PRBs allocated to PSSCH excluding remainder PRBs.

12. The apparatus of claim 8, wherein the TBS is further determined based on a number of reserved resource elements that are reserved for a second stage physical sidelink control channel (PSCCH).

13. The apparatus of claim 12, wherein the TBS is determined according to:

$$n_{RE} = \left( \sum_{l=1}^{N_{symbol}^{PSSCH}-1} M_{SC}^{PSSCH}(l) - M_{SC}^{DMRS}(l) - M_{SC}^{PT-RS}(l) - M_{SC}^{SCI-2}(l) \right) - N_{oh}^{PRB} n_{PRB}$$

where:
$M_{sc}^{PSSCH}(l)$ is the scheduled bandwidth of the PSSCH transmission without remainder PRBs;
$M_{sc}^{DMRS}(l)$ is the number of subcarriers in orthogonal frequency division multiplexing (OFDM) symbol l that carry the DMRS in the PSSCH transmission, assuming DMRS configuration with the most amount of resource elements (REs) configured for the resource pool, and assuming that a physical sidelink feedback channel (PSFCH) is present if configured, in all PRBs except remainder PRBs;
$M_{sc}^{PT-RS}(l)$ is the number of subcarriers in OFDM symbol l that carry the PT-RS, in the PSSCH transmission in all PRBs except remainder PRBs;
$M_{sc}^{PT-RS}(l)$ is a number of subcarriers in OFDM symbol l that carry the 2nd stage PSCCH;
$N_{symbol}^{PSSCH}$ is a number of allocated symbols for the PSSCH;
$N_{oh}^{PRB}$ is the overhead value per PRB overhead value preconfigured; and $n_{PRB}$ is a number of PRBs allocated to PSSCH excluding remainder PRBs.

14. The apparatus of claim 8, wherein the number of the symbols that are allocated for the PSSCH is determined based on a determination that a physical sidelink feedback channel is configured and is to be present in all slots.

* * * * *

UNITED STATES PATENT AND TRADEMARK OFFICE
CERTIFICATE OF CORRECTION

PATENT NO. : 12,010,053 B2
APPLICATION NO. : 17/174161
DATED : June 11, 2024
INVENTOR(S) : Alexey Khoryaev et al.

It is certified that error appears in the above-identified patent and that said Letters Patent is hereby corrected as shown below:

In the Claims

Column 40
Claim 1, Line 28, "symbol" should read "symbols"

Column 40
Claim 1, Line 30, "symbol" should read "symbols"

Column 40
Claim 4, Line 54, add "*l*" after "symbol" and before "that"

Column 40
Claim 4, Line 55, add a "," after "transmission"

Column 40
Claim 4, Lines 61-62, "l" should read "*l*" after "symbol" and before "that"

Column 41
Claim 6, Line 22, add "*l*" after "symbol" and before "that"

Column 41
Claim 6, Lines 29-30, "l" should read "*l*" after "symbol" and before "that"

Column 41
Claim 6, Lines 31-32, "l" should read "*l*" after "symbol" and before "that"

Column 41
Claim 6, Line 36, change "$_{ch}$" to "$_{oh}$"

Signed and Sealed this
Sixteenth Day of July, 2024

*Katherine Kelly Vidal*

Katherine Kelly Vidal
*Director of the United States Patent and Trademark Office*

Column 41
Claim 8, Line 57, "symbol" should read "symbols"

Column 41
Claim 8, Line 60, "symbol" should read "symbols"

Column 42
Claim 11, Line 18, "l" should read "$l$" after "symbol" and before "that"

Column 42
Claim 11, Line 25, add "$l$" after "symbol" and before "that"

Column 42
Claim 13, Line 52, "l" should read "$l$" after "symbol" and before "that"

Column 42
Claim 13, Lines 59-60, "l" should read "$l$" after "symbol" and before "that"

Column 42
Claim 13, Line 62, replace "xx" with "$M_{sc}^{sci-2}(l)$"

Column 42
Claim 13, Lines 62-63, "l" should read "$l$" after "symbol" and before "that"